United States Patent
Rico Alvarino et al.

(10) Patent No.: US 10,588,141 B2
(45) Date of Patent: Mar. 10, 2020

(54) MULTIPLE ANTENNAS AND INTERRUPTION TIME VALUES FOR SOUNDING REFERENCE SIGNAL (SRS) SWITCHING

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, Beijing (CN); Peter Gaal, San Diego, CA (US); Srinivas Yerramalli, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 15/633,626

(22) Filed: Jun. 26, 2017

(65) Prior Publication Data

US 2018/0007707 A1    Jan. 4, 2018

Related U.S. Application Data

(60) Provisional application No. 62/356,392, filed on Jun. 29, 2016, provisional application No. 62/374,522, filed on Aug. 12, 2016.

(51) Int. Cl.
*H04W 72/12* (2009.01)
*H04L 5/00* (2006.01)
(Continued)

(52) U.S. Cl.
CPC ....... *H04W 72/1263* (2013.01); *H04L 5/0051* (2013.01); *H04L 5/0096* (2013.01);
(Continued)

(58) Field of Classification Search
None
See application file for complete search history.

(56) References Cited

U.S. PATENT DOCUMENTS

2013/0242911 A1 *  9/2013  Heo ................. H04L 5/001
                                                    370/329
2014/0369242 A1 * 12/2014  Ng .................. H04W 72/0453
                                                    370/280
(Continued)

FOREIGN PATENT DOCUMENTS

WO     WO2016163126 A1    10/2016

OTHER PUBLICATIONS

R1-164446, 3GPP TSG RAN WG1 Meeting #85, Nanjing, China May 23-27, 2016 (Year: 2016).*

(Continued)

*Primary Examiner* — Alex Skripnikov
(74) *Attorney, Agent, or Firm* — Holland & Hart LLP

(57) ABSTRACT

A user equipment (UE) may transmit a sounding reference signal (SRS) on a component carrier (CC) that is otherwise configured for downlink communications. Due to a carrier aggregation configuration or UE capability, the UE may need to retune certain components to transmit on the CC. If the SRS transmission, including the retuning time, collides with another transmission (e.g., in uplink or downlink) the UE may drop the SRS, drop the other transmission, or puncture the other transmission to facilitate the SRS transmission. The determination about a collision may depend on the retuning time, channel, or type of control information in the other transmission. In some cases, a UE may drop the other transmission if transmitting the SRS would prevent the UE from transmitting a demodulation reference signal, hybrid automatic repeat request (HARQ) feedback. In some (Continued)

cases, the determination may be based upon a prioritization and may also depend on a subsequent subframe.

61 Claims, 22 Drawing Sheets

(51) Int. Cl.
| | |
|---|---|
| *H04L 12/28* | (2006.01) |
| *H04L 12/54* | (2013.01) |
| *H04L 29/06* | (2006.01) |
| *H04W 28/02* | (2009.01) |
| *H04L 5/14* | (2006.01) |

(52) U.S. Cl.
CPC .............. *H04L 12/28* (2013.01); *H04L 12/56* (2013.01); *H04L 29/06* (2013.01); *H04W 28/02* (2013.01); *H04L 5/0007* (2013.01); *H04L 5/1469* (2013.01)

(56) References Cited

U.S. PATENT DOCUMENTS

| | | | |
|---|---|---|---|
| 2015/0036601 A1* | 2/2015 | Kim ...................... | H04L 5/0048 370/329 |
| 2015/0163038 A1 | 6/2015 | Yang et al. | |
| 2016/0014701 A1 | 1/2016 | Nam et al. | |
| 2016/0021648 A1 | 1/2016 | Blankenship et al. | |
| 2016/0142190 A1 | 5/2016 | Lunttila et al. | |
| 2016/0302203 A1* | 10/2016 | Liu ........................ | H04L 5/001 |
| 2017/0264402 A1* | 9/2017 | Papasakellariou ....... | H04B 7/04 |
| 2017/0302419 A1* | 10/2017 | Liu ....................... | H04W 48/12 |

OTHER PUBLICATIONS

Huawei et al., "Discussion on SRS Carrier based Switching", 3GPP TSG-RAN WG4 Meeting #78bis, R4-162440, Apr. 1, 2016, XP051084311, Retrieved from the Internet: URL:http://www.3gpp.org/ftp/tsg_ran/WG4_Radio/TSGR4_78Bis/Docs/, 3 pages.
Huawei et al., "SRS Subframe Design for SRS Carrier based Switching", 3GPP TSG RAN WG1 Meeting #85, R1-164107, May 14, 2016, XP051090095, Retrieved from the Internet: URL:http://www.3gpp.org/ftp/tsg_ran/WG1_RL1/TSGR1_85/Docs/, 4 pages.
Huawei et al., "Support for SRS Switching among TDD Scells", 3GPP TSG-RAN WG2 Meeting #91 bis, R2-154344, XP051004880, Oct. 4, 2015, Retrieved from the Internet: URL:http://www.3gpp.org/ftp/Meetings_3GPP_SYNC/RAN2/Docs/, 5 pages.
Intel Corporation: "Consideration on Support SRS Carrier based Switching", 3GPP TSG-RAN WG1 #85, R1-164157, May 14, 2016, XP051096561, Retrieved from the Internet: URL:http://www.3gpp.org/ftp/tsg_ran/WG1_RL1/TSGR1_85/Docs, 4 pages.
International Search Report and Written Opinion—PCT/US2017/039488—ISA/EPO—Sep. 7, 2017.
Qualcomm Incorporated: "Details for SRS and PRACH Switching and Transmission", 3GPP TSG RAN WG1 Meeting #86bis, R1-1609983, Oct. 9, 2016, XP051150008, Retrieved from the Internet: URL:http://www.3gpp.org/ftp/Meetings_3GPP_SYNC/RAN1/Docs/, 6 pages.

* cited by examiner

MULTIPLE ANTENNAS AND INTERRUPTION TIME VALUES FOR SOUNDING REFERENCE SIGNAL (SRS) SWITCHING

CROSS REFERENCES

The present application for patent claims priority to U.S. Provisional Patent Application No. 62/356,392 by Rico Alvarino, et al., entitled "Multiple Antennas and Interruption Time Values For Sounding Reference Signal (SRS) Switching," filed Jun. 29, 2016, and to U.S. Provisional Patent Application No. 62/374,522 by Rico Alvarino, et al., entitled, "Multiple Antennas and Interruption Time Values For Sounding Reference Signal (SRS) Switching," filed Aug. 12, 2016, assigned to the assignee hereof, and hereby expressly incorporated by reference herein in their entirety.

BACKGROUND

The following relates generally to wireless communication and more specifically to multiple antennas and interruption time values in sounding reference signal (SRS) switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some wireless systems, a UE may communicate with a base station using one or more component carriers (CCs) using different frequency ranges. Depending on a configuration of the CCs, capabilities of the UE may impact the UE's ability to transmit reference signals that support the communication with the base station on the various CCs. The UE may be limited in its ability to concurrently transmit uplink control or data and SRS, and a failure to account such limitations may affect the quality or efficiency of communications the UE and the base station.

SUMMARY

A user equipment (UE) may be configured to switch component carriers (CCs) to transmit a sounding reference signal (SRS) on a CC designated as a downlink CC (e.g., a secondary CC). If the SRS transmission (including the retuning time) collides with another transmission (either uplink or downlink) the UE may drop the SRS, drop the other transmission, or puncture the other transmission. The determination of whether a collision could occur, and whether to drop a transmission to avoid a collision, may be based on a retuning time, properties of the channel, and the content of the other transmission. The UE may drop the other transmission if transmitting the SRS would prevent the UE from receiving a demodulation reference signal. In some cases, the determination may be based on the content of a subsequent subframe. In some examples, the UE may use different antenna port combinations when transmitting on different CCs or during different symbol periods to support efficient sounding of multiple antennas.

A method of for wireless communication is described. The method may include identifying a capability of a UE to transmit on a first carrier of a carrier aggregation (CA) configuration and a second carrier of the CA configuration, wherein the first carrier is configured for time division duplexing (TDD) or frequency division duplexing (FDD) and configured for uplink and downlink transmissions and the second carrier is configured for TDD and downlink transmissions, identifying a collision in a subframe between a communication on the first carrier and an SRS on the second carrier, and transmitting the communication on the first carrier or the SRS on the second carrier, or both, during the subframe based at least in part on the capability of the UE.

An apparatus for wireless communication is described. The apparatus may include means for identifying a capability of a UE to transmit on a first carrier of a CA configuration and a second carrier of the CA configuration, wherein the first carrier is configured for TDD or FDD and configured for uplink and downlink transmissions and the second carrier is configured for TDD and downlink transmissions, means for identifying a collision in a subframe between a communication on the first carrier and an SRS on the second carrier, and means for transmitting the communication on the first carrier or the SRS on the second carrier, or both, during the subframe based at least in part on the capability of the UE.

A mobile device is described. The mobile device may include a processor, memory in electronic communication with the processor, and instructions stored in the memory. The instructions may be operable to cause the processor to identify a capability of a UE to transmit on a first carrier of a CA configuration and a second carrier of the CA configuration, wherein the first carrier is configured for TDD or FDD and configured for uplink and downlink transmissions and the second carrier is configured for TDD and downlink transmissions, identify a collision in a subframe between a communication on the first carrier and a SRS on the second carrier, and transmit the communication on the first carrier or the SRS on the second carrier, or both, during the subframe based at least in part on the capability of the UE.

A non-transitory computer readable medium for wireless communication is described. The non-transitory computer-readable medium may include instructions operable to cause a processor to identify a capability of a UE to transmit on a first carrier of a CA configuration and a second carrier of the CA configuration, wherein the first carrier is configured for TDD or FDD and configured for uplink and downlink transmissions and the second carrier is configured for TDD and downlink transmissions, identify a collision in a subframe between a communication on the first carrier and a SRS on the second carrier, and transmit the communication on the first carrier or the SRS on the second carrier, or both, during the subframe based at least in part on the capability of the UE.

Some examples of the method, apparatus, mobile device, and non-transitory computer-readable medium described above may further include processes, features, means, or instructions for dropping the SRS based at least in part on the capability of the UE, and transmitting the communication on the first carrier.

Some examples of the method, apparatus, mobile device, and non-transitory computer-readable medium described above may further include processes, features, means, or instructions for dropping the communication on the first carrier based at least in part on the capability of the UE, and transmitting the SRS on the second carrier.

Some examples of the method, apparatus, mobile device, and non-transitory computer-readable medium described above may further include processes, features, means, or instructions for puncturing the communication on the first carrier based at least in part on the capability of the UE.

Some examples of the method, apparatus, mobile device, and non-transitory computer-readable medium described above may further include processes, features, means, or instructions for performing rate matching on the communication on the first carrier based at least in part on the puncturing.

In some examples of the method, apparatus, mobile device, and non-transitory computer-readable medium described above, the capability of the UE comprises a retuning time.

In some examples of the method, apparatus, mobile device, and non-transitory computer-readable medium described above, the capability of the UE comprises a retuning time corresponding to a number of symbol periods, and wherein the communication on the first carrier may be dropped when the number of symbol periods exceeds a predetermined threshold.

In some examples of the method, apparatus, mobile device, and non-transitory computer-readable medium described above, the communication on the first carrier may include a physical uplink shared channel (PUSCH) communication, and the method, apparatus, mobile device, and non-transitory computer-readable medium described above may further include processes, features, means, or instructions for dropping the SRS when the collision involves symbols of a demodulation reference signal (DMRS), or puncturing the PUSCH transmission when the collision does not involve symbols of the DMRS.

In some examples of the method, apparatus, mobile device, and non-transitory computer-readable medium described above, the communication on the first carrier may include a PUSCH communication, and the method, apparatus, mobile device, and non-transitory computer-readable medium described above may further include processes, features, means, or instructions for dropping the SRS when the PUSCH communication comprises hybrid automatic repeat request (HARQ) feedback and the collision involves symbols of the HARQ feedback.

In some examples of the method, mobile device, apparatus, and non-transitory computer-readable medium described above, the communication on the first carrier or the SRS on the second carrier, or both may be transmitted based at least in part on a content of the communication, a channel type, a cyclic prefix length, or any combination thereof.

In some examples of the method, apparatus, mobile device, and non-transitory computer-readable medium described above, the communication on the first carrier or the SRS on the second carrier, or both, may be transmitted based at least in part on a radio resource control (RRC) configuration or an enhanced interference mitigation and traffic adaptation (eIMTA) configuration. In some examples of the method, apparatus, mobile device, and non-transitory computer-readable medium described above, the communication and the SRS may be in a same subframe.

Some examples of the method, apparatus, mobile device, and non-transitory computer-readable medium described above may further include processes, features, means, or instructions for identifying a retuning time threshold, wherein transmitting the communication on the first carrier or the SRS on the second carrier, or both, may be based at least in part on the retuning time threshold.

Some examples of the method, apparatus, mobile device, and non-transitory computer-readable medium described above may further include processes, features, means, or instructions for determining that a retuning time collides with a demodulation reference signal, wherein transmitting the communication on the first carrier or the SRS on the second carrier, or both may be based at least in part on the determination.

Some examples of the method, apparatus, mobile device, and non-transitory computer-readable medium described above may further include processes, features, means, or instructions for transmitting an indication of the capability of the UE or an explicit indication of whether a retuning time impacts a downlink reception capability.

Some examples of the method, apparatus, mobile device, and non-transitory computer-readable medium described above may further include processes, features, means, or instructions for selecting a control channel monitoring mode based at least in part on the capability of the UE. Some examples of the method, apparatus, and non-transitory computer-readable medium described above may further include processes, features, means, or instructions for refraining from monitoring a control channel based at least in part on the control channel monitoring mode.

Some examples of the method, apparatus, mobile device, and non-transitory computer-readable medium described above may further include processes, features, means, or instructions for identifying a prioritization scheme that includes HARQ feedback, aperiodic channel state information (A-CSI), channel quality information (CQI), DMRS, aperiodic SRS (A-SRS), periodic channel state information (P-CSI), periodic SRS (P-SRS), user data, or any combination thereof, wherein transmitting the communication on the first carrier or the SRS on the second carrier, or both may be based at least in part on the prioritization scheme.

Some examples of the method, apparatus, mobile device, and non-transitory computer-readable medium described above may further include processes, features, means, or instructions for determining that the first carrier may have not been monitored during a symbol period designated for a physical HARQ indicator channel (PHICH) based at least in part on transmitting the SRS on the second carrier. Some examples of the method, apparatus, and non-transitory computer-readable medium described above may further include processes, features, means, or instructions for suspending an uplink HARQ process based at least in part on the determination.

Some examples of the method, apparatus, mobile device, and non-transitory computer-readable medium described above may further include processes, features, means, or instructions for determining that the first carrier may have not been monitored during a symbol period designated for a physical control format indicator channel (PCFICH) based at least in part on transmitting the SRS on the second carrier. Some examples of the method, apparatus, and non-transitory computer-readable medium described above may further include processes, features, means, or instructions for identifying a starting symbol period of a physical downlink shared channel (PDSCH) or an enhanced physical downlink control channel (EPDCCH) based at least in part on the determination.

Some examples of the method, apparatus, mobile device, and non-transitory computer-readable medium described above may further include processes, features, means, or instructions for identifying the starting symbol may be based at least in part on a bandwidth of the first carrier.

Some examples of the method, apparatus, mobile device, and non-transitory computer-readable medium described above may further include processes, features, means, or instructions for receiving an indication of the starting symbol prior to transmitting the SRS on the second carrier, wherein identifying the starting symbol may be based at least in part on receiving the indication.

Some examples of the method, apparatus, mobile device, and non-transitory computer-readable medium described above may further include processes, features, means, or instructions for scaling a transport block size (TBS) based at least in part on the identified starting symbol.

DETAILED DESCRIPTION

Figure 1:
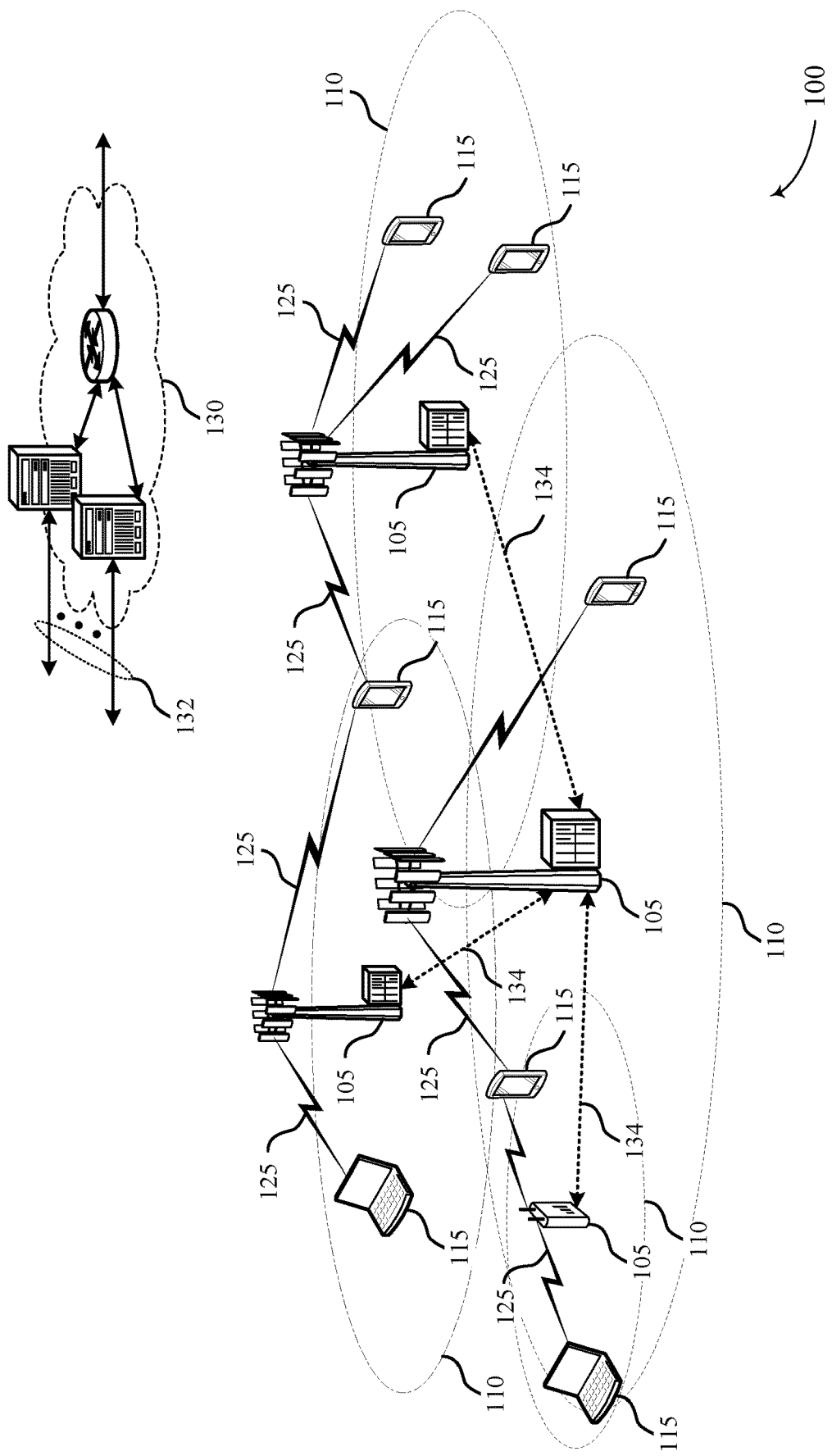
FIG. 1 illustrates an example of a system for wireless communication that supports multiple antennas and interruption time values in sounding reference signal (SRS) switching in accordance with aspects of the present disclosure.

A user equipment (UE) or a base station operating in a carrier aggregation (CA) configuration using multiple component carriers (CCs) may account for a UE's capabilities when scheduling communications and transmitting or triggering sounding reference signals (SRS). For example, the UE may facilitate downlink communications on a CC designated for downlink communications by transmitting a reference signal during the inactive uplink subframes of the downlink CC. However, such transmissions may involve retuning a radio to transmit the signal, or puncturing an uplink signal, which may disrupt uplink or downlink communications on the primary CC (PCC or PCell). Thus, the UE or base station, or both, may strategically transmit or trigger SRS transmissions to avoid or ameliorate collisions with other transmissions.

By way of example, if the SRS transmission, including a retuning time of the UE, collides with another transmission (either uplink or downlink), the UE may drop the SRS transmission, drop the other transmission, or puncture the other transmission. The determination may be based on the UE's retuning time, properties of the channel, and the content of the other transmission. In some cases, the UE may drop the other transmission if transmitting the SRS would prevent the UE from receiving a demodulation reference signal (DMRS). In some cases, the determination may be based on the content of subsequent subframes.

Thus, a UE may determine how to handle retuning or switching to transmit SRS, which may be referred to as SRS switching, based on the UE's retuning time. For example, the UE may drop SRS transmission for the subframe, drop transmission on another channel, puncture transmission on another channel, or any combination thereof. The technique used may be based on, for example, the channels involved in the switching, a cyclic prefix length, or various other factors. The UE may also prioritize certain transmissions in the event of a collision.

A UE may handle SRS switching based on an implicit or explicit indication received from a base station, which may configure the UE based on the UE's capabilities. For example, the UE may attempt to puncture a transmission instead of dropping the transmission, then the UE may implicitly determine whether to drop the transmission based on what symbols are punctured. In some examples, the UE's switching time may affect downlink transmissions. Therefore, the UE may indicate to the base station if the SRS switch may affect both uplink and downlink transmissions, or only uplink transmissions.

In some examples, a UE may look ahead to a subsequent subframe to decide whether to transmit SRS. The UE may determine to transmit SRS based on, for example, retuning time and a TDD (or FDD) configuration of the first CC or the second CC. In some cases, the UE may indicate whether it has the processing power to handle the look-ahead. If the UE can handle look-ahead, the SRS transmission may be performed based on the UE's ability to perform SRS switching. The UE may decide to look ahead based on TDD configurations for a channel. The UE may also decide to perform look ahead or not based on the UE's capability, switching time, and various other factors.

Aspects of the disclosure introduced above are described below in the context of a wireless communications system. Subsequent figures depict examples of CA configurations and timing configurations that support SRS switching based on the retuning time of a UE. Aspects of the disclosure are further illustrated by and described with reference to apparatus diagrams, system diagrams, and flowcharts that relate to multiple antennas and interruption time values in SRS switching.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. Wireless communications system 100 may support multiple antennas and interruption time values in SRS switching. For example, a UE 115 may switch from a first CC to a second CC to transmit an SRS signal on the second CC. The UE 115 may also sound each antenna or look ahead in the first CC.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile device, a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. A base station, an entity in the core network, or components of a base station or core network entity may be referred to as a network device.

In some cases, a base station 105 and a UE 115 may communicate using more than one carrier in a CA configuration. Each aggregated carrier may also be referred to as a CC. Each CC can have a bandwidth of, e.g., 1.4, 3, 5, 10, 15, or 20 MHz. In some cases, the number of CCs can be limited to, e.g., a maximum of five giving maximum aggregated bandwidth is 100 MHz. In FDD, the number of aggregated carriers can be different in downlink and uplink. The number of uplink CCs may be equal to or lower than the number of downlink CCs. The individual CCs can also be of different bandwidths. For TDD the number of CCs as well as the bandwidths of each CC will normally be the same for downlink and uplink. CCs may be arranged in a number of ways. For example, a CA configuration may be based on contiguous CCs within the same operating frequency band, i.e., called intra-band contiguous CA. Non-contiguous allocations can also be used, where the CCs may be either be intra-band, or inter-band.

A CA configuration may include CCs of a number of different configurations. For example, the CA configuration may include a primary cell (PCell) and one or more secondary cells (SCells). The PCell may be configured to carry uplink and downlink control information on a physical uplink control channel (PUCCH) and physical downlink control channel (PDCCH) (or on an enhanced PDCCH (EPDCCH), respectively. PDCCH on a PCell may include scheduling information for resources of the PCell or for resources of one or more SCells, or both. An SCell may include PDCCH, which may include scheduling information for resources of that SCell or for one or more other SCells. Some SCells may be configured for downlink communications and may not be configured for uplink communications, while a PCell may be configured for both uplink and downlink communications. Various carriers of the CA may be time division duplex (TDD) or frequency division duplex (FDD) configured. A CA configuration may include both TDD and FDD configured carriers.

PDCCH may carry downlink control information (DCI) in at least one control channel element (CCE), which may include nine logically contiguous resource element groups (REGs), where each REG contains 4 resource elements. DCI includes information regarding downlink scheduling assignments, uplink resource grants, transmission scheme, uplink power control, hyrid automatic repeat request (HARQ) information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identifier (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space.

The common CCE region may be monitored by all UEs 115 served by a base station 105 and may include information such as paging information, system information, random access procedures, and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

In some cases, a control channel may be transmitted using resources that would otherwise be used for data transmission (i.e., a physical downlink shared channel (PDSCH)). These control channels may be known as enhanced PDCCH or EPDCCH. Each EPDCCH set may have 2, 4, or 8 physical resource block (PRB) pairs. An EPDCCH may be scheduled using enhanced control channel elements (ECCEs) and enhanced resource element groups (EREGs). An ECCE may include 4 EREGs, and an EREG that include 9 resource elements (REs). In some cases, such as when a channel utilizes an extended CP or special subframes (e.g., in a TDD system), one ECCE may also could consist of 8 EREGs. The number of ECCEs used for an EPDCCH may depend on the aggregation level. An EPDCCH may be UE specific. That is, they may be transmitted exclusively using UE-specific search space. In some cases, certain DCI formats (e.g., DCI formats 3/3A and 1C for multiple UEs 115) may not be supported in an EPDCCH. In some cases, a UE 115 not supports EPDDCH if it does not have a sufficiently fast decoder, as the EPDCCH is decoded at the end of a subframe (because portions of it may fall in each symbol of the subframe), whereas PDCCH may be transmitted using the first few symbols of a subframe.

UEs 115 may transmit SRS to facilitate communications on the downlink. An SRS may be transmitted by UE 115 using a predetermined sequence (e.g., a Zadoff-Chu sequence) so that a base station 105 may estimate the uplink channel quality. An SRS transmission may not be associated with transmission of data on another channel, and may be transmitted periodically on a wide bandwidth (e.g., a bandwidth including more subcarriers than are allocated for uplink data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an uplink scheduler. A base station 105 may also utilize an SRS to check timing alignment status and send time alignment commands to the UE 115. SRS may be transmitted on CCs that are designated for both uplink and downlink, and on downlink specific carriers (e.g., secondary CCs). In some cases, a UE 115 may return a radio to transmit an SRS on another carrier, and the retuning time may collide with other communications.

A UE 115 may be configured to collaboratively communicate with multiple base stations 105 through, for example, multiple input, multiple output (MIMO), coordinated multipoint (CoMP), or other schemes. MIMO techniques use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. In some examples, the UE 115 may transmit SRS on multiple antennas to increase channel reciprocity. For example, in a first symbol, the UE 115 may transmit SRS from a first antenna. Then, in a second symbol, the UE 115 may transmit SRS from one or more other antennas.

Figure 2:
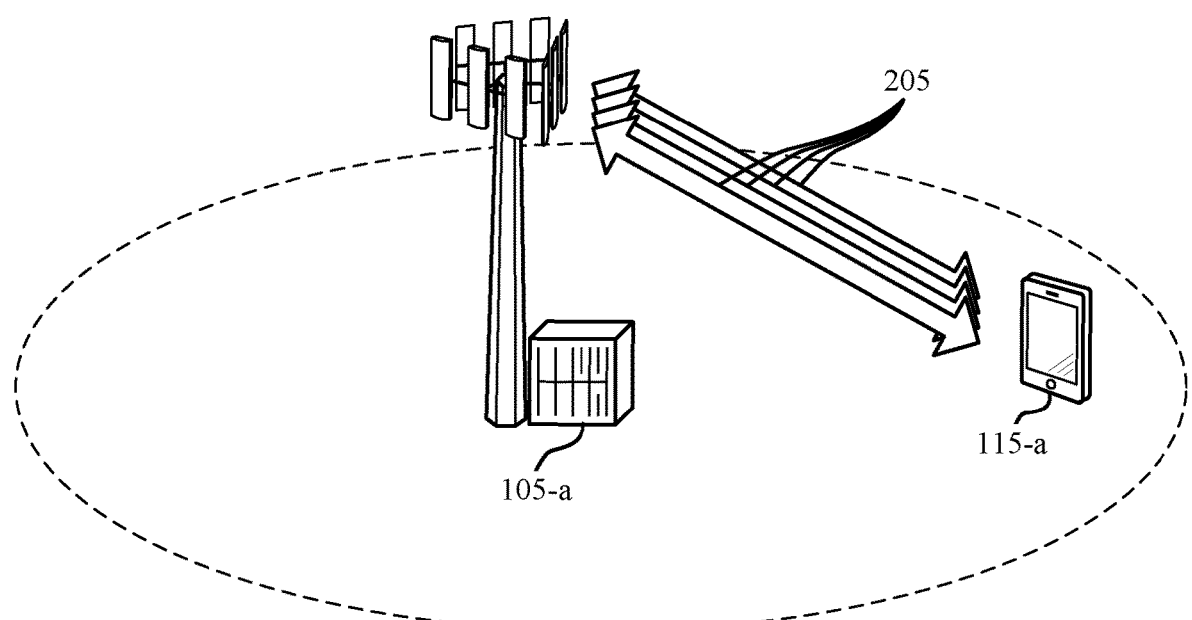
FIG. 2 illustrates an example of a wireless system that supports SRS transmission using multiple antennas and interruption time values in SRS switching in accordance with aspects of the present disclosure.

FIG. 2 illustrates an example of a wireless system 200 for multiple antennas and interruption time values in SRS switching. UE 115-a may be an example of a UE 115 as described herein with reference to FIG. 1. UE 115-a may be configured for CA, and may support communication on one or more CCs, which may be TDD or FDD. Base station 105-a may be an example of a base station 105 as described herein with reference to FIG. 1. Some or all of the CCs 205 may be configured for TDD transmission between UE 115-a and base station 105-a. One of the CCs 205 may be configured as a PCell for UE 115-a.

In some cases, UE 115-a may retune from one CC (e.g., the PCell) to a second CC designated for downlink communications (e.g., an SCell) to transmit SRS. However, If the SRS collides with another transmission (either uplink or downlink), the SRS or the other transmission may be dropped. In other cases, a transmission may be punctured and both may be transmitted.

Thus, UE 115-a may puncture an uplink transmission on a first CC to transmit an SRS on an uplink resource of a second CC. Whether UE 115-a drops the colliding transmission may be determined based on implicit or explicit rules. In some examples, puncturing the uplink transmission to transmit SRS may also impact downlink transmission (e.g., from a previous downlink portion of a special subframe, or in a subsequent subframe). Furthermore, UE 115-a may perform a look ahead procedure on the first CC to determine how transmitting the SRS will impacts subsequent transmissions.

UE 115-a may determine how to handle uplink switching based on a retuning time of UE 115-a. For example, UE 115-a may drop SRS transmission for the subframe, drop transmission on another channel, puncture transmission on another channel, or any combination thereof. The technique used may also be based on, for example, the channels involved, a cyclic prefix length, or various other factors.

UE 115-a may handle SRS switching based on implicit rules or by explicit indication from a serving cell. For instance, UE 115-a may attempt to puncture a transmission instead of dropping the transmission, and UE 115-a may implicitly determine whether to drop the transmission based on what symbols are punctured. If an SRS or the retuning time collides with another, high priority signal (e.g., DMRS), then UE 115-a may drop the entire transmission (e.g., a subframe) in which the signal was transmitted. In another example, if an acknowledgment/negative acknowledgment (ACK)/(NAK) is transmitted over a physical uplink shared channel (PUSCH) and the SRS (e.g., including retuning) affects ACK/NAK symbols, UE 115-a may drop the SRS transmission. If the SRS (e.g., with the retuning time) collides with the PUSCH but not a higher priority signal, UE 115-a may continue to only puncture PUSCH. In some cases, as an example of an explicit indication, UE 115-a may determine to drop the subframe if the switching time is greater than N symbols, or puncture the subframe if the switching time is N or less symbols.

In some examples, the switching/retuning time of UE 115-a may affect downlink transmissions. UE 115-a may indicate to base station 105-a if the SRS switch may affect both uplink and downlink or only uplink. For example, if UE 115-a uses a same local oscillator (LO) for downlink and uplink, the switching may impact both uplink and downlink. However, if UE 115-a uses a different LO for downlink and uplink, then switching may affect uplink but not downlink. There may be an indication for any combination, per band, or per CA combination. The CA combination may include both regular CA configurations and SRS CCs. In some examples, such as when the downlink transmission is affected, some downlink symbols may be lost.

UE 115-a may interrupt downlink transmission when switching CCs to transmit SRS or when switching CCs after transmitting SRS. For example, if SRS transmission is in subframe N, UE 115-a may interrupt downlink subframe N−1. Interruption before an SRS transmission may impact a downlink subframe or a downlink pilot time slot (DwPTS). Interrupting before SRS transmission may be appropriate for long interruption times, as interrupting before SRS may present stricter transmission timelines. In some examples, UE 115-a may limit possible SRS positions or limit switching times to prevent UE 115-a from missing PDCCH in the DwPTS. In another example, such as where a downlink transmission time interval (TTI) may be interrupted, UE 115-*a* may monitor PDCCH for the remaining downlink subframe. Based on the switching time, TDD configuration, and subframe number, UE 115-*a* may refrain from monitoring an EPDCCH or may switch to PDCCH.

Additionally or alternatively, UE 115-*a* may interrupt a downlink transmission after transmitting SRS. Interrupting after the SRS transmission may be applicable at a greater number of times in the transmission; therefore, it may be appropriate to interrupt after SRS transmission more often than interruption before SRS transmission. In some cases, a PDCCH may be lost in a switching subframe. In such cases, if UE 115-*a* loses a first symbol(s) due to retuning, UE 115-*a* may not decode PDCCH and may not identify a PDSCH assignment. UE 115-*a* may monitor a number of symbols in a PDCCH subframe, and UE 115-*a* may rate match a number of symbols, for example M symbols, where M is the number of symbols that can be transmitted during the switching time. Additionally or alternatively, the PDSCH indicated in the PDCCH subframe may be scheduled from another CC, and the PDSCH may also rate match around the first M symbols.

In a look ahead configuration, UE 115-*a* may prioritize certain transmissions in the event of a collision. For example, UE 115-*a* may give highest priority to ACK/NAK, aperiodic CSI (A-CSI), a rank indicator (RI), a precoding type indicator (PTI), a CSI-RS resource indicator (CRI), and/or a DMRS. Then, UE 115-*a* may prioritize aperiodic SRS (A-SRS), periodic CSI (P-CSI), periodic SRS (P-SRS), and PUSCH, respectively. In some examples, UE 115-*a* may prioritize P-SRS over P-CSI. The prioritization may be based on whether the switching impacts the first slot or second slot (e.g., due to an impact on DMRS in PUSCH or PUCCH). If UE 115-*a* is unable to perform look-ahead, UE 115-*a* may determine, based on SRS switching timing for a certain set of CC combinations, whether the next subframe is a downlink or uplink subframe. In some cases (e.g., for P-SRS), if the following subframe is downlink, SRS may be transmitted. Otherwise, SRS may be dropped. In the case of A-SRS, UE 115-*a* may consider transmitting, but may also drop the next subframe.

In another example, UE 115-*a* may look ahead to a subsequent subframe to decide whether or not to transmit SRS. That is, based on looking at, for example, the next subframe, UE 115-*a* may decide whether or not to transmit SRS. In some examples, UE 115-*a* may decide to transmit SRS based on a retuning time and TDD configuration. In some cases, UE 115-*a* may indicate whether it has processing power to handle the look-ahead. If UE 115-*a* can handle look-ahead, the SRS transmission on SRS CCs may be performed based on the ability of UE 115-*a* to perform SRS switching. The ability of UE 115-*a* to perform the SRS switching may be based on a frequency band or a CC combination, or both.

UE 115-*a* may decide to perform a look ahead operation based on its capability, switching time, and various other factors. In another example, look ahead for SRS transmission may be determined based on an RRC configuration or an enhanced interference mitigation and traffic adaptation (eIMTA) indicator. In some examples, UEs 115 of similar capability may be grouped into sets, resulting in the same handling in the same set. In another example, the SRS CC may be a function of scheduling, for example as described above. Determining SRS transmission based on scheduling may be based on DMRS, uplink control information (UCI) type, and other prioritization parameters.

In some cases, UE 115-*a* may decide to look ahead based on the TDD frame configuration of a channel. Table 1, below, depicts various examples of TDD frame configurations, where "D" represents a downlink subframe, "U" represents an uplink subframe, and "S" represents a special subframe.

TABLE 1

Depicts multiple configurations of subframes

| Configuration | SF 0 | SF 1 | SF 2 | SF 3 | SF 4 | SF 5 | SF 6 | SF 7 | SF 8 | SF 9 |
|---|---|---|---|---|---|---|---|---|---|---|
| Configuration 1 | D | S | U | U | U | D | S | U | U | U |
| Configuration 2 | D | S | U | U | D | D | S | U | U | D |
| Configuration 3 | D | S | U | D | D | D | S | U | D | D |
| Configuration 4 | D | S | U | U | U | D | D | D | D | D |
| Configuration 5 | D | S | U | U | D | D | D | D | D | D |
| Configuration 6 | D | S | U | D | D | D | D | D | D | D |
| Configuration 7 | D | S | U | U | U | D | S | U | U | D |

UE 115-*a* may transmit at different times and in different subframes depending on the frame configuration for a given CC. Timing for SRS transmissions may thus depend on a frame configuration being employed. Several examples of SRS timing are described below.

In frame configuration 1 of Table 1, UE 115-*a* may transmit SRS in a second CC during the uplink pilot timing symbol (UpPTS) of special subframe 1 or 6 (i.e., SF 1 and SF6 respectively), or during uplink subframes 2-4 or 7-9. For subframes 1-3 and 6-8, the following subframe will be an uplink subframe. For subframes 4 or 9, the following subframe will be a downlink subframe. In frame configuration 2 of Table 1, UE 115-*a* may transmit SRS in a second CC during the UpPTS of special subframe 1 or 6, or the last symbol of uplink subframes 2-3 or 7-8. For subframes 1-2 and 6-7, the following subframe will be an uplink subframe. For subframes 3 and 8, the following subframe will be a downlink subframe.

In frame configuration 3 of Table 1, UE 115-*a* may transmit SRS in a second CC during the UpPTS of special subframe 1 or 6, or the last symbol of uplink subframes 2 or 7. For subframes 1 and 6, the following subframe will be an uplink subframe. For subframes 2 and 7, the following subframe will be a downlink subframe. In frame configuration 4 of Table 1, UE 115-*a* may transmit SRS in a second CC during the UpPTS of special subframe 1, or the last symbol of uplink subframes 2-4. For subframes 1-3, the following subframe will be an uplink subframe. For subframe 4, the following subframe will be a downlink subframe.

In frame configuration 5 of Table 1, UE 115-*a* may transmit SRS in a second CC during the UpPTS of special subframe 1, or the last symbol of uplink subframes 2-3. For subframes 1-2, the following subframe will be an uplink subframe. For subframe 3, the following subframe will be a downlink subframe. In frame configuration 6 of Table 1, UE 115-*a* may transmit SRS in a second CC during the UpPTS of special subframe 1, or the last symbol of uplink subframe 2. For subframe 1, the following subframe will be an uplink subframe. For subframe 2, the following subframe will be a downlink subframe. In frame configuration 7 of Table 1, UE 115-*a* may transmit SRS in a second CC during the UpPTS of special subframe 1 or 6, or the last symbol of uplink subframes 2-4 or 7-8. For subframes 1-3 and 6-7, the following subframe will be an uplink subframe. For subframes 3 and 8, the following subframe will be a downlink subframe.

In some cases, UE 115-*a* may sound each antenna of an array for channel reciprocity. However, some UEs 115 may not support simultaneous transmission from all of the antennas available. In these cases, UE 115-a may switch transmissions across antennas or antenna port combinations. For example, if UE 115-a is capable of both MIMO communication and switching transmission across antennas, UE 115-a may perform SRS using two antennas at a time, then switch to transmit SRS from the other two antennas. For example, UE 115-a may transmit SRS from a first pair of antennas in a first symbol. Then, in a second symbol, UE 115-a may transmit SRS from a second pair of antennas. UE 115-a may use different combs (i.e., patterns of alternating frequency subbands) or cyclic shifts to multiplex SRS transmission transmitted from different antenna ports at the same time. UE 115-a may use the same or different combs or cyclic shifts across the symbols.

In some cases, a physical HARQ indicator channel (PHICH) or a physical control format indicator channel (PCFICH) may be missed due to retuning away from a carrier to transmit SRS. If the PHICH is missed, UE 115-a may, in some examples, operate as if the PHICH were not present. For example, UE 115-a may suspend a HARQ process.

If a PCFICH transmission is missed, UE 115-a may miss an indication of the length of a control region within a subframe. As a result, UE 115-a may not know the starting symbol of a PDSCH or EPDCCH region. Thus, in some cases, the starting symbol for PDSCH or EPDCCH region may be standardized or configured by higher layers. In some cases, a specific standard starting symbol may be used or assumed in cases when UE 115-a tunes away to transmit SRS. In some cases, the assumed or specified starting symbol may not correspond to the actual starting symbol as indicated in the missed PCFICH. Thus, the PDCCH region may puncture the PDSCH or EPDCCH region. In this case, UE 115-a may rate match a message based on the higher layer signaling (or standard starting symbol). In some cases, the starting symbol may be based on a system bandwidth.

In addition to using a starting symbol based on higher layer communication, or a standardized default, the starting symbol may indicated in EPDCCH (i.e., using an additional field in DCI). In some cases, the PDSCH transport block size (TBS) may be scaled based on the starting symbol (e.g., using 0.75 scaling). This may apply to cases in which PDSCH or EPDCCH is punctured at the end of a subframe. Rate matching in these cases may also be accomplished using signaling in EPDCCH or by higher layers.

Figure 3:
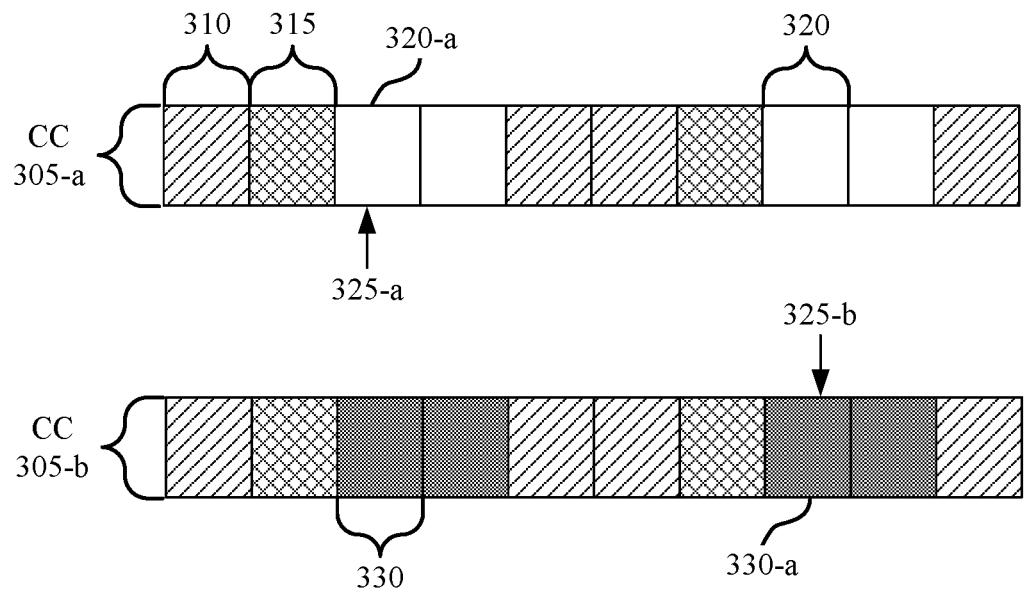
FIG. 3 illustrates an example of a carrier aggregation (CA) configuration that supports multiple antennas and interruption time values in SRS switching in accordance with aspects of the present disclosure.

FIG. 3 illustrates an example of a CA configuration 300 that supports SRS transmission using multiple antennas and interruption time values in SRS switching in accordance with aspects of the present disclosure.

First CC 305-a may be an example of a CC described herein with reference to FIG. 2. Specifically, first CC 305-a may be an example of a primary CC, or PCell. First CC 305-a may also be an example of a primary SCell (PSCell) of a dual connectivity configuration (i.e., a multi-carrier configuration in which a UE 115 communicates with CCs aggregated across base stations 105 that communicate with one another using a non-ideal backhaul). Second CC 305-b may be an example of a CC described herein with reference to FIG. 2. Specifically, second CC 305-b may be an example of a secondary cell or SCell. In some examples, second CC 305-b may be a TDD carrier configured primarily for downlink transmissions.

Each CC 305 may contain downlink subframes 310. Each CC 305 may also contain special subframes 315. Special subframes 315 may be configurable for both uplink and downlink transmission, separated by a guard period. Each CC 305 may contain a number of active uplink subframes 320, where an active uplink subframe 320 may be a resource that is available for communication by a UE 115. A CC 305 may also contain inactive uplink subframes 330. In some examples, the UE 115 may have inactive uplink subframes 330 in one CC 305 (e.g., second CC 305-b) while having active uplink subframes 320 in another CC 305 (e.g., first CC 305-a).

The UE 115 may transmit SRS 325-a in active uplink subframe 320-a. SRS 325-a may be used by a serving base station 105 to determine uplink and downlink channel conditions. The UE 115 may transmit SRS 325-b in inactive uplink subframe 330-a of second CC 305-b. If the UE 115 has active uplink subframes 320 on first CC 305-a, the UE 115 may retune a radio to second CC 305-b and transmit SRS 325-b during inactive subframe 330-a. In some examples, CC 305-b may be a TDD carrier configured for downlink transmissions.

Figure 4:
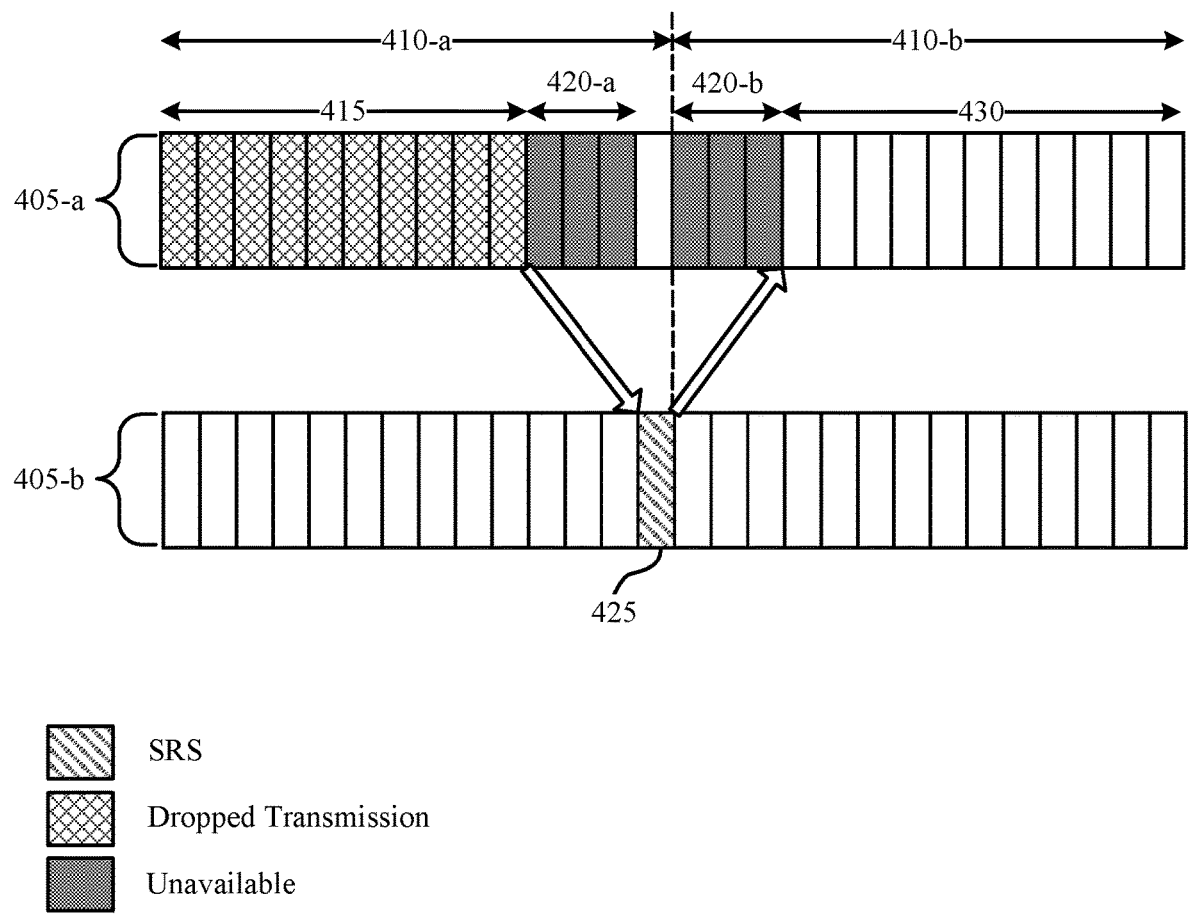
FIG. 4 illustrates an example of component carrier (CC) switching that supports multiple antennas and interruption time values in SRS switching in accordance with aspects of the present disclosure.

FIG. 4 illustrates an example of a CC switching pattern 400 for multiple antennas and interruption time values in SRS switching. CC switching pattern 400 may illustrate an example in which a UE 115 retunes from first CC 405-a to second CC 405-b to transmit SRS.

First CC 405-a may be an example of a CC described herein with reference to FIG. 2, or first CC 305-a as described herein with reference to FIG. 3. First CC 405-a may be an example of a primary CC, or PCell, or it may be a PSCell. Second CC 405-b may be an example of a CC described herein with reference to FIG. 2 or a second CC 305-b as described herein with reference to FIG. 3. Specifically, second CC 305-b may be an example of a secondary CC, or SCell. In some examples, CC 305-b may be a TDD carrier configured primarily for downlink transmissions. Transmissions in subframe 410-a may be dropped or punctured by the UE 115 in order to transmit SRS on another CC (i.e., second CC 405-b).

For example, transmission 415 may be dropped or punctured by the UE 115 based on the UE retuning time. For example, if the SRS collides with a DMRS, a base station 105 may be unable to successfully decode PUSCH transmissions, and the UE 115 may drop the transmission 415. In some examples, the UE 115 may determine to drop the transmission based on an implicit rules. For example, if the UE 115 collides with a high priority transmission (e.g., a DMRS, ACK/NAK), the UE 115 may drop the entire transmission (e.g., subframe 410-a for first CC 405-a). Additionally or alternatively, the UE 115 may determine to drop a transmission based on an explicit indication from a serving cell, for example, a serving cell may indicate a threshold number of symbols included in a retuning period 420.

Retuning period 420-a may indicate the time period that the UE 115 uses to retune from first CC 405-a to second CC 405-b. The length of retuning period 420-a (e.g., the number of symbols) may be based on the UE's capabilities, the channels involved in the retune, a cyclic prefix length, or various other factors. In some examples, retuning period 420-a may collide with a high priority symbol, for example a DMRS or an ACK. In some examples, if retuning period 420-a collides with a high priority transmission, the UE 115 may drop transmission of SRS 425.

SRS 425 may be an example of an SRS as described herein with reference to FIG. 2 or SRS 325-a or 325-b as described herein with reference to FIG. 3. SRS 425 may be used to indicate uplink channel conditions to a base station. SRS 425 may be transmitted on a secondary CC (e.g., a SCell or SCC), for example on a CC which is primarily configured for downlink TDD transmission.

Retuning period 420-*b* may be a result of the UE 115 retuning from second CC 405-*b* back to first CC 405-*a*. The retuning period 420-*b* may puncture subframe 410-*b*. However, retuning period 420-*b* may collide with a high priority signal or portion of a transmission (e.g., DMRS, ACK, etc.) such that the UE 115 drops a transmission in subframe 410-*b*. The length of retuning period 420-*a* (e.g., the number of symbols) may be based on the UE's capabilities. Determining whether to drop or puncture a transmission may be based on the channels involved, a cyclic prefix length of a carrier, or various other factors.

Available symbols 430 in a subsequent subframe may also be based on the time it takes for the UE 115 to retune from the second CC 405-*b* back to the first CC 405-*a*. Thus, the number of available symbols 430 may be based on the length of retuning period 420-*b*. In some cases, available symbols 430 may be sufficient to transmit or receive a transmission during subframe 410-*b*, but transmitting SRS 425 may lead to dropping or puncturing transmissions in this subframe as well. Thus, in some cases the UE 115 may perform a look ahead procedure as described herein to determine whether to transmit the SRS.

Figure 5:
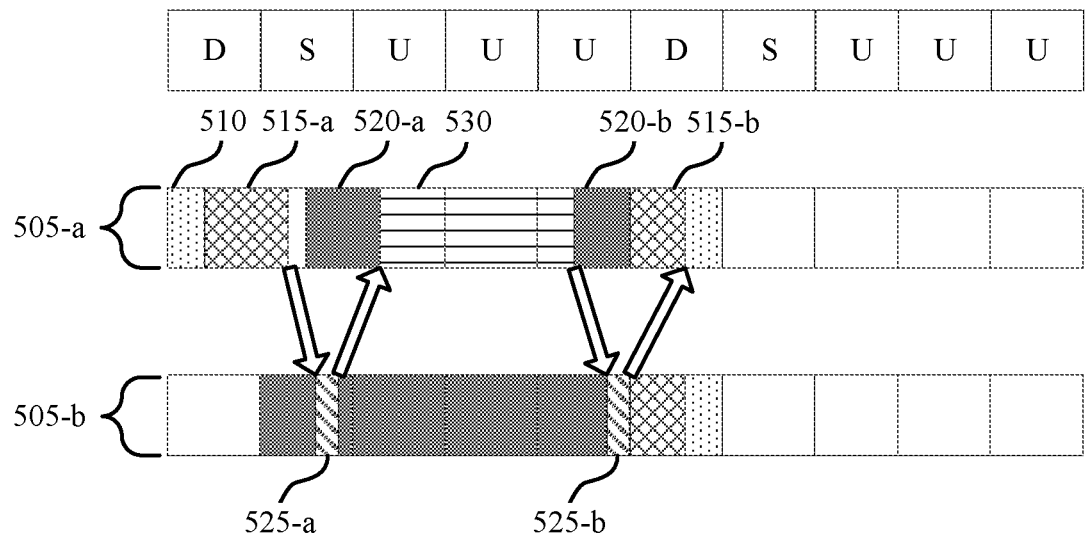
FIG. 5 illustrates an example of an uplink/downlink transmission puncturing and rate matching that supports multiple antennas and interruption time values in SRS switching in accordance with aspects of the present disclosure.

FIG. 5 illustrates an example of an uplink/downlink transmission puncturing and rate matching 500 for multiple antennas and interruption time values in SRS switching. In some cases, certain uplink or downlink resources may be potentially unavailable due to the retuning time of while switching to a different CC to transmit SRS.

First CC 505-*a* may be an example of a CC (e.g., a first CC or PCell) described herein with reference to FIGS. 2-4. First CC 505-*a* may be a TDD configured CC. Second CC 505-*b* may be an example of a CC (e.g., a second CC, SCell, or SCC) described herein with reference to FIGS. 2-4. In some examples, second CC 505-*b* may be a TDD carrier configured primarily for downlink transmissions.

Each CC 505 may include resources for downlink monitoring 510. In some examples, a UE 115 may monitor for indications of a TDD configuration for the current subframe or for an upcoming subframe. Each CC 505 may include downlink resources 515. During the downlink resources 515, the UE 115 may receive downlink information such as DMRS, ACK/NAK information, CSI, or the like. In some cases the UE 115 may switch CCs during downlink resources 515.

For example, the UE 115 may switch during downlink resources 515-*a*. In some examples, downlink resources 515-*a* may occur during a downlink subframe and portions of a special subframe and may be unavailable for communications due to the retuning time of switching between first CC 505-*a* and second CC 505-*b*. The duration of downlink resources 515-*a* may, in some examples, be based on the retuning time of the UE 115. Based on the UE's capability and the duration of downlink resources 515-*a*, the UE 115 may or may not be able to utilize downlink resources 515-*a*. For example, if the UE 115 begins to switch too close to uplink transmission, or if the UE 115 takes a long time to retune, the UE 115 may not have sufficient time to utilize the downlink resources 515-*a*. Additionally or alternatively, if the UE 115 punctures a high priority downlink symbol (e.g., DMRS, ACK/NAK, etc.) during downlink resources 515-*a*, the UE 115 may drop downlink resources 515-*a*.

Each CC 505 may include unavailable uplink resources 520. The unavailable uplink resources 520 may correspond to a switching time of the UE 115 (e.g., from first CC 505-*a* to second CC 505-*b*). For example, the UE 115 may be unable to transmit uplink information during unavailable uplink resources 520-*a* on first CC 505-*a* because the UE 115 may be switching or have already switched (i.e., retuned) to second CC 505-*b*. The duration of unavailable uplink resources 520-*a* may be based on the retuning time of the UE 115 and the channels involved in the SRS switch. The unavailable uplink resources 520-*a* may occur after the UE 115 retunes to the second CC 505-*b* (e.g., during or after downlink transmission, in some cases during a special subframe) and before the UE 115 retunes to the first CC 505-*a* during an uplink subframe (i.e., interrupting uplink transmission after SRS transmission). Unavailable uplink resources 520-*a* may also correspond to when the UE 115 is transmitting by another CC 505. For example, uplink subframes of the first CC 505-*a* may be unavailable while the UE 115 transmits by second CC 505-*b*. Unavailable uplink resources 520-*a* may also be based on the retuning time of the UE 115 as it retunes to the first CC 505-*a* and away from second CC 505-*b*.

In some examples, the UE 115 may transmit an SRS 525 after switching to second CC 505-*b*. The SRS 525 may be used to indicate uplink channel conditions to a base station. In some examples, first CC 505-*a* may be interrupted for a switch during downlink transmission. Interrupting downlink transmission on first CC 505-*a* to transmit SRS 525-*a* may impact the downlink transmission, or a DwPTS. In some examples, the UE 115 may limit SRS positions or switching times to prevent the UE 115 from missing a downlink subframe or DwPTS. Additionally or alternatively, in some cases the UE 115 may switch to monitoring PDCCH instead of EPDCCH.

The UE 115 may switch back to first CC 505-*a* and begin to communicate on a PUSCH 530 after transmitting SRS 525-*a*. For example, the UE 115 may switch CCs to first CC 505-*a* from second CC 505-*b* during PUSCH 530. Switching during PUSCH 530 may prevent the UE 115 from transmitting on uplink resources of first CC 505-*a* while the UE 115 is transmitting on second CC 505-*b*. In some examples, the UE 115 may rate match when returning to CC 505-*a*.

In some examples, the UE 115 may be unable to transmit during unavailable uplink resources 520-*b* if the UE 115 switches to second CC 505-*b* during an uplink subframe (e.g., during PUSCH 530). Unavailable uplink resources 520-*b* may be similar to unavailable uplink resources 520-*a* as described above. The duration of unavailable uplink resources 520-*b* resources may be based on the retuning time of the UE 115, the channels involved in the SRS switch, or a cyclic prefix length, among other factors.

After switching to CC 505-*b* for a second time, the UE 115 may transmit SRS 525-*b*, which may be similar to SRS 525-*a*. After transmitting SRS 525-*b*, the UE 115 may interrupt uplink transmission (e.g., PUSCH 530).

The UE 115 may switch to CC 505-*a* during downlink transmission if, for example, the UE 115 switches to CC 505-*b* during or after uplink transmission. In some examples, the UE 115 may or may not be able to utilize downlink resources 515-*b* based on the retuning time and capability of the UE 115 and. For example, if the UE 115 misses PDCCH after retuning during downlink transmission, the UE 115 may be unable to get a PDSCH assignment and may drop the transmission. The UE 115 may then monitor EPDCCH in the subframe. The UE 115 may rate match EPDCCH around M symbols, where M is the number of symbols that may occur in the UE's switching time. In some examples, the UE 115 may miss PDCCH if the UE 115 interrupts uplink transmission after transmitting SRS. If the UE 115 misses PDCCH information, the UE 115 may be unable to get a PDSCH assignment.

Figure 6:
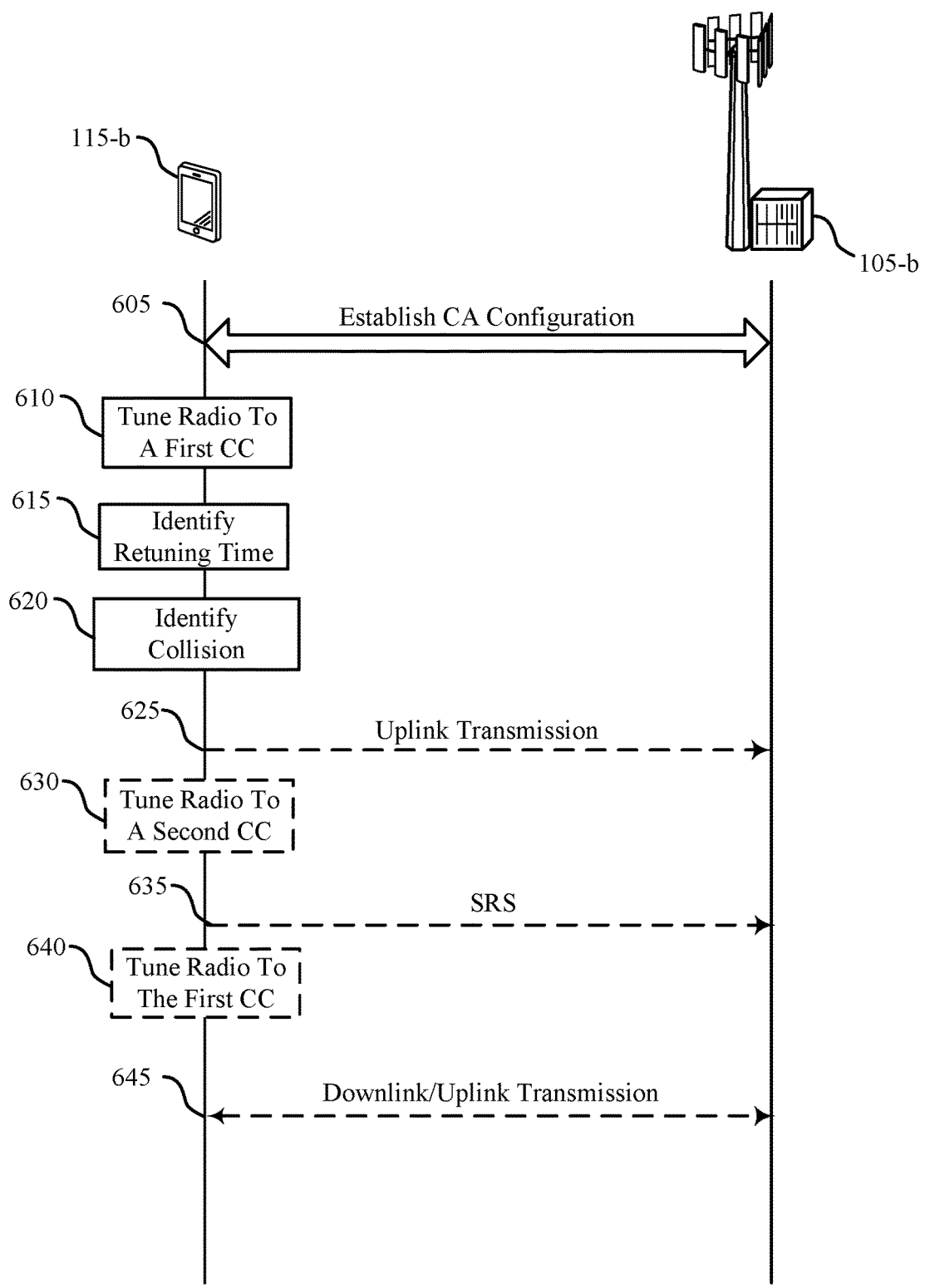
FIG. 6 illustrates an example of a process flow that supports multiple antennas and interruption time values in SRS switching in accordance with aspects of the present disclosure.

FIG. 6 illustrates an example of a process flow 600 for multiple antennas and interruption time values in SRS switching. The steps of process flow 600 may be performed by UE 115-b and base station 105-b, which may be examples of a UE 115 and a base station 105 as described above with reference to FIGS. 1 and 2.

At step 605, UE 115-b may establish CA configuration. UE 115-b may identify a number of CCs which UE 115-b may use for transmission. UE 115-b may establish a PCell, an SCell, or any number of SCCs. In some examples, the CCs may be configured for TDD communication.

At step 610, UE 115-b may tune a radio to a first CC, for example a PCell. At step 615, UE 115-b may identify a retuning time. The retuning time may be based on the capability of UE 115-b, the channel to which UE 115-b may tune a radio, among other factors. Thus, UE 115-b may identify a capability to transmit on a first carrier of a CA configuration and a second carrier of the CA configuration; the first carrier may be configured for TDD and FDD and configured for uplink and downlink transmissions and the second carrier may be configured for TDD and downlink transmissions.

In some cases, UE 115-b may transmit an indication of the capability (i.e., the retuning time) or an explicit indication of whether a retuning time impacts a downlink reception capability to base station 105-b.

At step 620, UE 115-b may identify a potential SRS transmission on the second carrier, and identify a collision between a communication on the first carrier and the SRS on the second carrier. UE 115-b may also identify channel properties of the transmission or of the carriers (i.e., the PCell). For example, the SRS transmissions may be a function of scheduling or based on RRC configurations or an eIMTA indicator.

At step 625, UE 115-b may transmit an uplink communication to base station 105-b. However, in some cases, in some cases, the transmission may be dropped or punctured based on transmitting the SRS. Thus, in some cases, UE 115-b may not transmit the uplink communication to base station 105-b based on the identified retuning time of step 615. In some cases, UE 115-b may puncture the communication and/or perform rate matching on the communication on the first carrier based at least in part on the puncturing.

In some cases, dropping, transmitting, or puncturing the uplink communication (or surrounding downlink communications) may be based on the content of the communication, a channel type, a cyclic prefix length, or any combination thereof. Dropping, transmitting, or puncturing the colliding communications may also be based on an RRC configuration or an eIMTA configuration.

In some cases, UE 115-b may identify a retuning time threshold, such that transmitting the communication or the SRS, or both, may be based at least in part on the retuning time threshold. UE 115-a may receive an indication of the retuning time threshold from base station 105-b. In some cases, UE 115-b may determine that the retuning time collides with a DMRS, and transmitting the communication or the SRS, or both, may be based at least in part on the determination. In some cases, UE 115-b may send the UE capability to the network, where the capability may include a retuning time and/or an indication of whether the retuning time impacts a downlink reception capability of the UE In some cases, UE 115-b may select a control channel monitoring mode based at least in part on the capability (i.e., the retuning time), and refrain from monitoring a control channel based at least in part on the control channel monitoring mode. For example, UE 115-b may only monitor PDCCH if it will miss a significant number of symbols during the latter portion of a subframe for retuning. During subsequent subframes, UE 115-b may monitor EPDCCH instead of PDCCH because it may miss the beginning of the subframe. Base station 105-b may select and indicate the control monitoring mode to UE 115-b. In some cases, the process may include determining a control channel to monitor in the subframe or in a next subframe and refraining from transmitting SRS when, based on the capability, monitoring the determined control channel would be disrupted by the SRS transmission.

In some cases, UE 115-b may identify a prioritization scheme that includes HARQ feedback, A-CSI, CQI, DMRS, A-SRS, P-CSI, P-SRS, user data, or any combination thereof, and transmitting the communication or the SRS, or both may be based on the prioritization scheme.

In some cases, UE 115-b may identify a look ahead capability, and transmitting the communication or the SRS, or both may be based on the look ahead capability. In some cases, UE 115-b may transmit an indication of the look ahead capability to base station 105-b. In some cases, the look ahead capability may include an ability to perform SRS carrier switching during a first subframe based on one or more properties of a second subframe following the first subframe. In some cases, the look ahead capability includes an inability to perform SRS carrier switching based on the second subframe. In some cases, UE 115-b may drop the communication on the first carrier based on the look ahead capability. In some cases, UE 115-b may transition from a first look ahead mode to a second look ahead mode based at least in part on the look ahead capability.

At step 630, UE 115-b may tune a radio to a second CC to transmit the SRS. For example, UE 115-b may tune a radio from a PCell to a SCell. In some cases, tuning the radio may be based on channel properties identified in step 620. In other cases, UE 115-b may drop the SRS based at least in part on the retuning time and the one or more properties, and thus UE 115-b may not retune to the second carrier.

At step 635, UE 115-b may transmit an SRS to base station 105-b. UE 115-b may transmit SRS if UE 115-b retuned a radio in step 630. In some examples UE 115-b may transmit SRS during inactive uplink subframes of a TDD CC configured primarily for downlink transmission.

At step 640, UE 115-b may tune the radio to the first CC and away from the second CC (i.e., back to the first CC). It should be noted that UE 115-b may only tune the radio to the first CC if UE 115-b tuned away from the first CC in step 630. Thus, UE 115-b may transmit the communication on the first carrier or the SRS on the second carrier, or both, during the subframe based at least in part on the capability of UE 115-b (i.e., the retuning time).

At step 645, UE 115-b may commence downlink or uplink transmission after retuning back to the first carrier. In some cases, UE 115-b may drop or puncture a subsequent transmission based on the retuning time.

In some cases, UE 115-b may transmit a first uplink communication (e.g., a first SRS) on a first subframe using a first plurality of antenna ports, and transmit a second uplink communication (e.g., a second SRS) on a second subframe using a second plurality of antenna ports, where the second plurality of antenna ports does not overlap with the first plurality of antenna ports.

Figure 7:
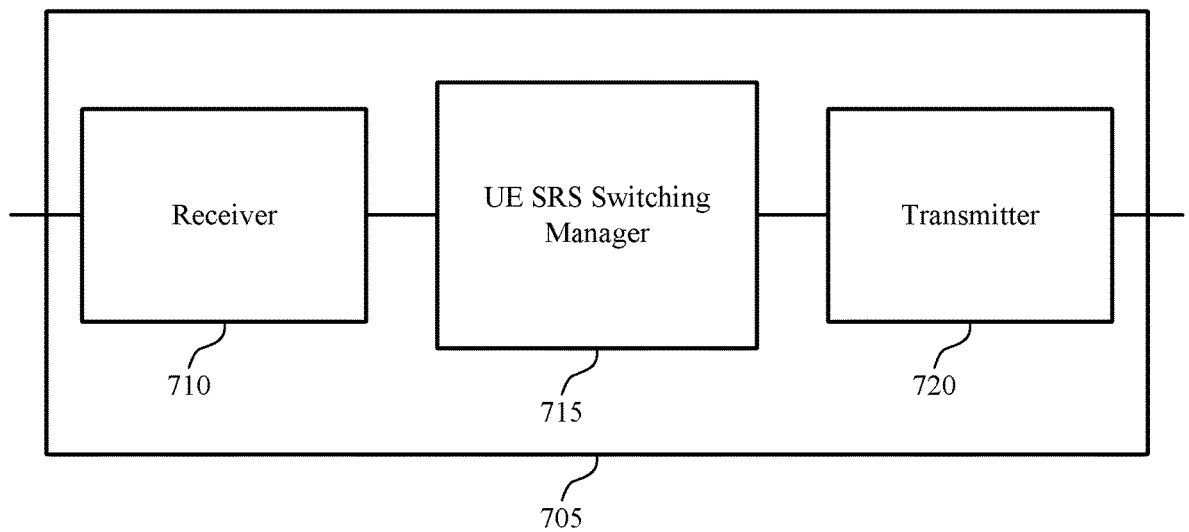
FIGS. 7 through 9 show block diagrams of a device or devices that support multiple antennas and interruption time values in SRS switching in accordance with aspects of the present disclosure.

FIG. 7 shows a block diagram 700 of a wireless device 705 that supports multiple antennas and interruption time values in SRS switching in accordance with various aspects of the present disclosure. Wireless device 705 may be an example of aspects of a UE 115 as described with reference to FIG. 1. Wireless device 705 may include receiver 710, UE SRS switching manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to multiple antennas and interruption time values in SRS switching, etc.). Information may be passed on to other components of the device. The receiver 710 may be an example of aspects of the transceiver 1035 described with reference to FIG. 10.

UE SRS switching manager 715 may be an example of aspects of the UE SRS switching manager 1015 described with reference to FIG. 10. UE SRS switching manager 715 may identify a capability of a UE to transmit on a first carrier of a CA configuration and a second carrier of the CA configuration. The first carrier may be configured for TDD and FDD and configured for uplink and downlink transmissions and the second carrier may be configured for TDD and downlink transmissions. In some cases, UE SRS switching manager 715 may identify a collision in a subframe between a communication on the first carrier and a SRS on the second carrier.

The UE SRS switching manager 715 may, in combination with transmitter 720, also transmit a first uplink communication on a first subframe using a first set of antenna ports and transmit a second uplink communication on a second subframe using a second set of antenna ports, where, for example, the second set of antenna ports is non-overlapping with the first set of antenna ports.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Transmitter 720 may transmit the communication on the first carrier or the SRS on the second carrier, or both, during the subframe based on the capability of the UE. In some cases, the communication and the SRS are in a same subframe.

Figure 8:
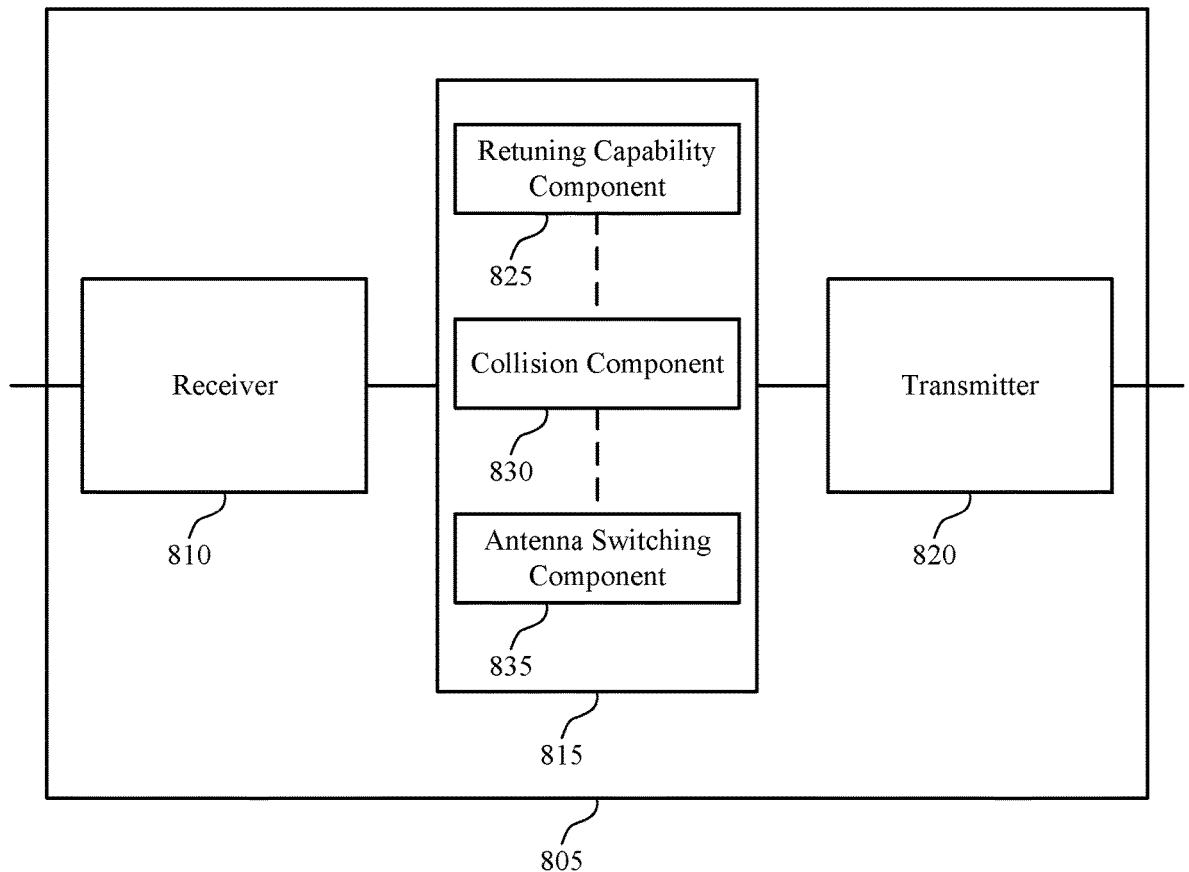

FIG. 8 shows a block diagram 800 of a Wireless device 805 that supports multiple antennas and interruption time values in SRS switching in accordance with various aspects of the present disclosure. Wireless device 805 may be an example of aspects of a wireless device 705 or a UE 115 as described with reference to FIGS. 1 and 7. Wireless device 805 may include receiver 810, UE SRS switching manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to multiple antennas and interruption time values in SRS switching, etc.). Information may be passed on to other components of the device. The receiver 810 may be an example of aspects of the transceiver 1035 described with reference to FIG. 10.

UE SRS switching manager 815 may be an example of aspects of the UE SRS switching manager 1015 described with reference to FIG. 10. UE SRS switching manager 815 may also include retuning capability component 825, collision component 830, and antenna switching component 835.

Retuning capability component 825 may identify a capability of a UE to transmit on a first carrier of a CA configuration and a second carrier of the CA configuration, where, for example, the first carrier is configured for TDD and FDD and configured for uplink and downlink transmissions and the second carrier is configured for TDD and downlink transmissions. In some examples, retuning capability component 825 may identify a retuning time threshold. Transmitting the communication on the first carrier or the SRS on the second carrier, or both, may be based on the retuning time threshold. Retuning capability component 825 may receive an indication of the retuning time threshold from a base station. Retuning capability component 825 may also identify the retuning time threshold based on receiving the indication. In some cases, the communication on the first carrier or the SRS on the second carrier, or both, are transmitted based on a content of the communication, a channel type, a cyclic prefix length, or any combination thereof.

Collision component 830 may identify a collision in a subframe between a communication on the first carrier and a SRS on the second carrier.

Antenna switching component 835 may transmit a first uplink communication on a first subframe using a first set of antenna ports and transmit a second uplink communication on a second subframe using a second set of antenna ports.

In some cases, the first uplink communication is a first SRS and the second uplink communication is a second SRS. In some cases, the first uplink communication includes a set of cyclic shifts (or combs) associated with each of the first set of antenna ports. In some cases, the first uplink communication includes a set of frequency patterns associated with each of the first set of antenna ports. In some cases, the first set of antenna ports and the second set of antenna ports each include two antenna ports. In some cases, the first uplink communication is transmitted on a first carrier of a CA configuration and the second uplink communication is transmitted on a second carrier of the CA configuration.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
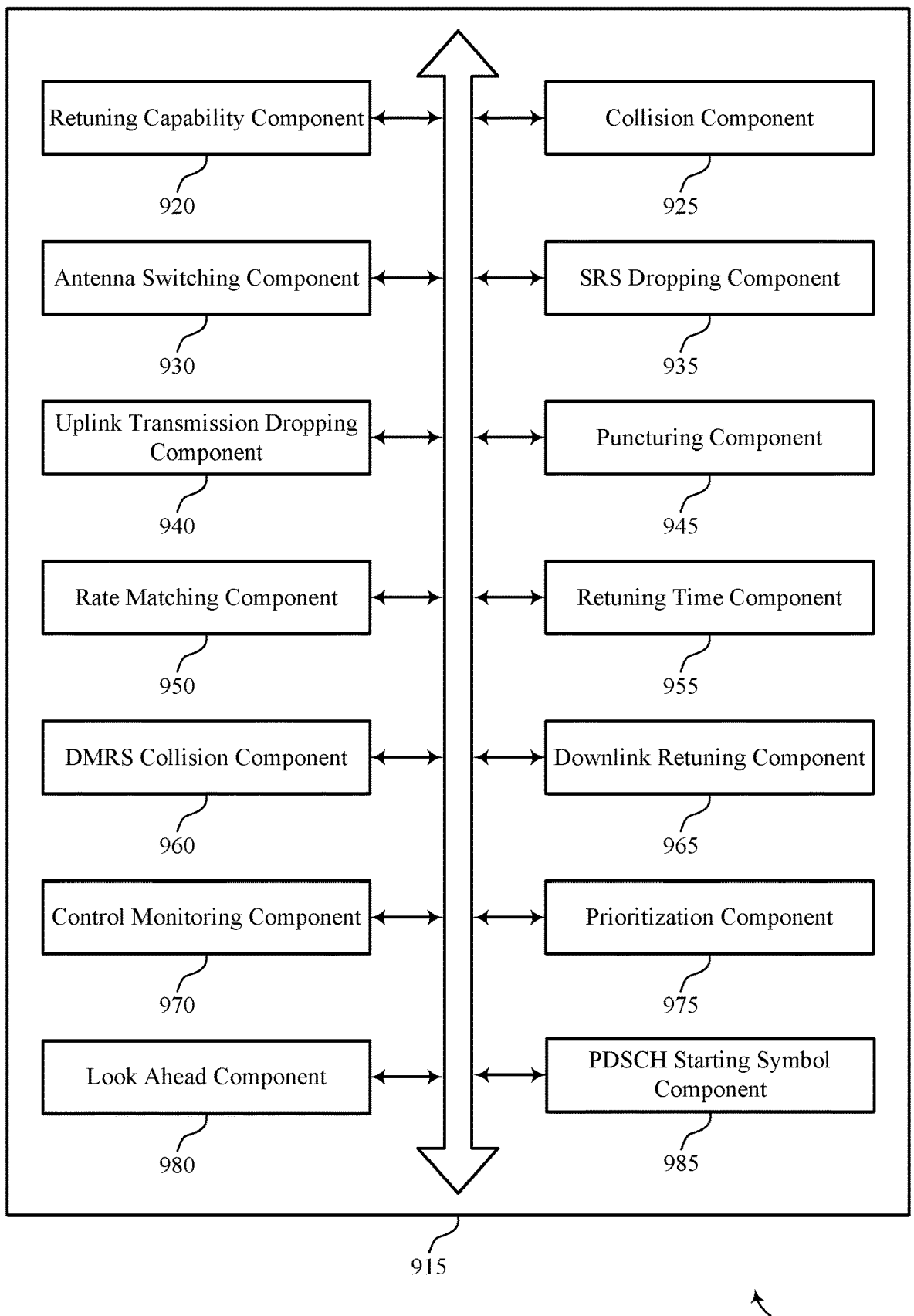

FIG. 9 shows a block diagram 900 of a UE SRS switching manager 915 that supports multiple antennas and interruption time values in SRS switching in accordance with various aspects of the present disclosure. The UE SRS switching manager 915 may be an example of aspects of a UE SRS switching manager 715, a UE SRS switching manager 815, or a UE SRS switching manager 1015 described with reference to FIGS. 7, 8, and 10. The UE SRS switching manager 915 may include retuning capability component 920, collision component 925, antenna switching component 930, SRS dropping component 935, uplink transmission dropping component 940, puncturing component 945, rate matching component 950, retuning time component 955, DMRS collision component 960, downlink retuning component 965, control monitoring component 970, prioritization component 975, look ahead component 980, and PDSCH starting symbol component 985. Each of these modules may communicate, directly or indirectly, with one another (e.g., via one or more buses).

Retuning capability component 920 may identify a capability of a UE to transmit on a first carrier of a CA configuration and a second carrier of the CA configuration, where, for example, the first carrier is configured for TDD and FDD and configured for uplink and downlink transmissions and the second carrier is configured for TDD and downlink transmissions, and identify a retuning time threshold. In some cases, transmitting the communication on the first carrier or the SRS on the second carrier, or both, is based on the retuning time threshold. In some examples, retuning capability component 920 may receive an indication of the retuning time threshold from a base station, and in some cases, identifying the retuning time threshold may be based on receiving the indication. In some cases, the communication on the first carrier or the SRS on the second carrier, or both, are transmitted based on a RRC configuration or an eIMTA configuration.

Collision component 925 may identify a collision in a subframe between a communication on the first carrier and a SRS on the second carrier. Antenna switching component 930 may transmit a first uplink communication on a first subframe using a first set of antenna ports and transmit a second uplink communication on a second subframe using a second set of antenna ports. The second set of antenna ports may be non-overlapping with the first set of antenna ports.

SRS dropping component 935 may drop the SRS based on the capability of the UE, where, for example, the communication is transmitted on the first carrier. Uplink transmission dropping component 940 may drop the communication on the first carrier based on the capability of the UE, where, for example, the SRS is transmitted on the second carrier and drop the communication following transmission of the SRS based on the look ahead capability.

Puncturing component 945 may puncture the communication on the first carrier based on the capability of the UE. Rate matching component 950 may perform rate matching on the communication on the first carrier based on the puncturing. Retuning time component 955 may estimate a retuning time for switching a radio for communications on a different CC. DMRS collision component 960 may determine that a retuning time collides with a demodulation reference signal, and transmitting the communication on the first carrier or the SRS on the second carrier, or both, may be based on the determination.

Downlink retuning component 965 may transmit an indication of the capability of the UE or an explicit indication of whether a retuning time impacts a downlink reception capability. Control monitoring component 970 may select a control channel monitoring mode based on the capability of the UE and refrain from monitoring a control channel based on the control channel monitoring mode. Prioritization component 975 may identify a prioritization scheme that includes HARQ feedback, A-CSI, CQI, DMRS, A-SRS, P-CSI, P-SRS, user data, or any combination thereof. Transmitting the communication on the first carrier or the SRS on the second carrier, or both, may be based on the prioritization scheme.

Look ahead component 980 may identify a look ahead capability. Transmitting the communication on the first carrier or the SRS on the second carrier, or both, may be based on the look ahead capability, transmit an indication of the look ahead capability to a serving base station, and transition from a first look ahead mode to a second look ahead mode based on the look ahead capability. In some cases, the look ahead capability includes an ability to perform SRS carrier switching during a first subframe based on one or more properties of a second subframe following the first subframe. In some cases, the look ahead capability includes an inability to perform SRS carrier switching during a first subframe based on one or more properties of a second subframe following the first subframe.

PDSCH starting symbol component 985 may identify a starting symbol for a PDCCH or an EPDCCH region in the case that a PCFICH message is missed due to tuning away from a carrier to transmit SRS. In some cases, PDSCH starting symbol component 985 may determine that the first carrier has not been monitored during a symbol period designated for a PCFICH based at least in part on transmitting the SRS on the second carrier; and identify a starting symbol period of a PDSCH or an EPDCCH based at least in part on the determination. PDSCH starting symbol component 985 may also receive an indication of the starting symbol prior to transmitting the SRS on the second carrier, where identifying the starting symbol is based at least in part on receiving the indication. In some cases, PDSCH starting symbol component 985 may scale a TBS based at least in part on the identified starting symbol. In some examples, the starting symbol may be based on a bandwidth of the first carrier.

Figure 10:
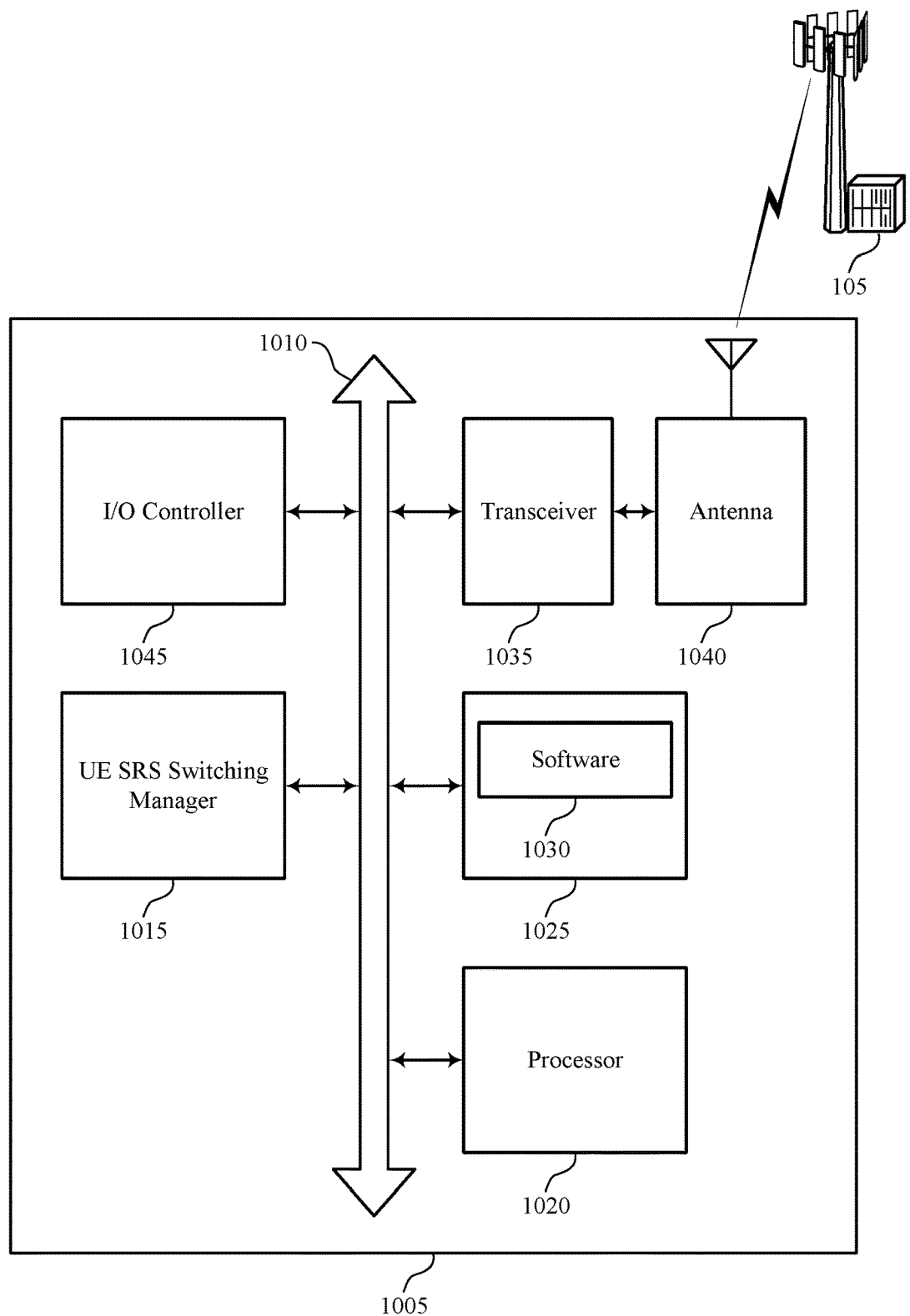
FIG. 10 illustrates a block diagram of a system including a user equipment (UE) that supports multiple antennas and interruption time values in SRS switching in accordance with aspects of the present disclosure.

FIG. 10 shows a diagram of a system 1000 including a device 1005 that supports multiple antennas and interruption time values in SRS switching in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE SRS switching manager 1015, processor 1020, memory 1025, software 1030, transceiver 1035, antenna 1040, and I/O controller 1045.

Processor 1020 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting multiple antennas and interruption time values in SRS switching) 1020.

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a Basic Input-Output system (BIOS) which may control basic hardware and/or software operation such as the interaction with peripheral components or devices.

Software 1030 may include code to implement aspects of the present disclosure, including code to support multiple antennas and interruption time values in SRS switching. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
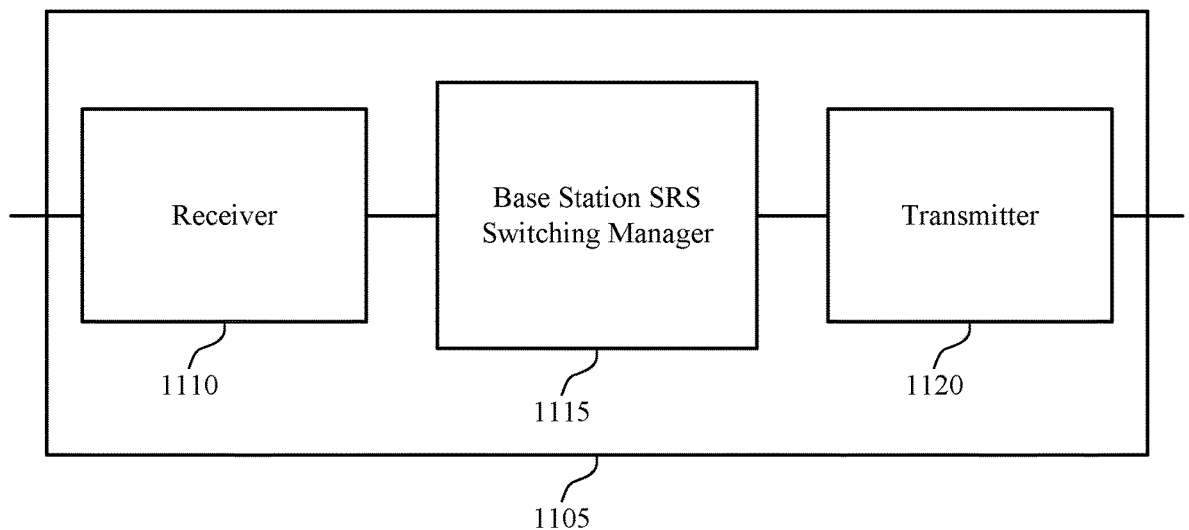
FIGS. 11 through 13 show block diagrams of a device or devices that support multiple antennas and interruption time values in SRS switching in accordance with aspects of the present disclosure.

FIG. 11 shows a block diagram 1100 of a wireless device 1105 that supports multiple antennas and interruption time values in SRS switching in accordance with various aspects of the present disclosure. Wireless device 1105 may be an example of aspects of a base station 105 as described with reference to FIG. 1. Wireless device 1105 may include receiver 1110, base station SRS switching manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to multiple antennas and interruption time values in SRS switching, etc.). Information may be passed on to other components of the device. The receiver 1110 may be an example of aspects of the transceiver 1435 described with reference to FIG. 14.

Base station SRS switching manager 1115 may be an example of aspects of the base station SRS switching manager 1415 described with reference to FIG. 14. Base station SRS switching manager 1115 may, in combination with receiver 1110, receive an indication that a retuning time for a UE impacts a downlink reception capability, and in combination with transmitter 1120, may transmit an indication of a control channel monitoring mode based on the retuning time for the UE and the downlink reception capability.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas. Transmitter 1120 may transmit a downlink control channel, a SRS trigger, or both based on the control channel monitoring mode.

Figure 12:
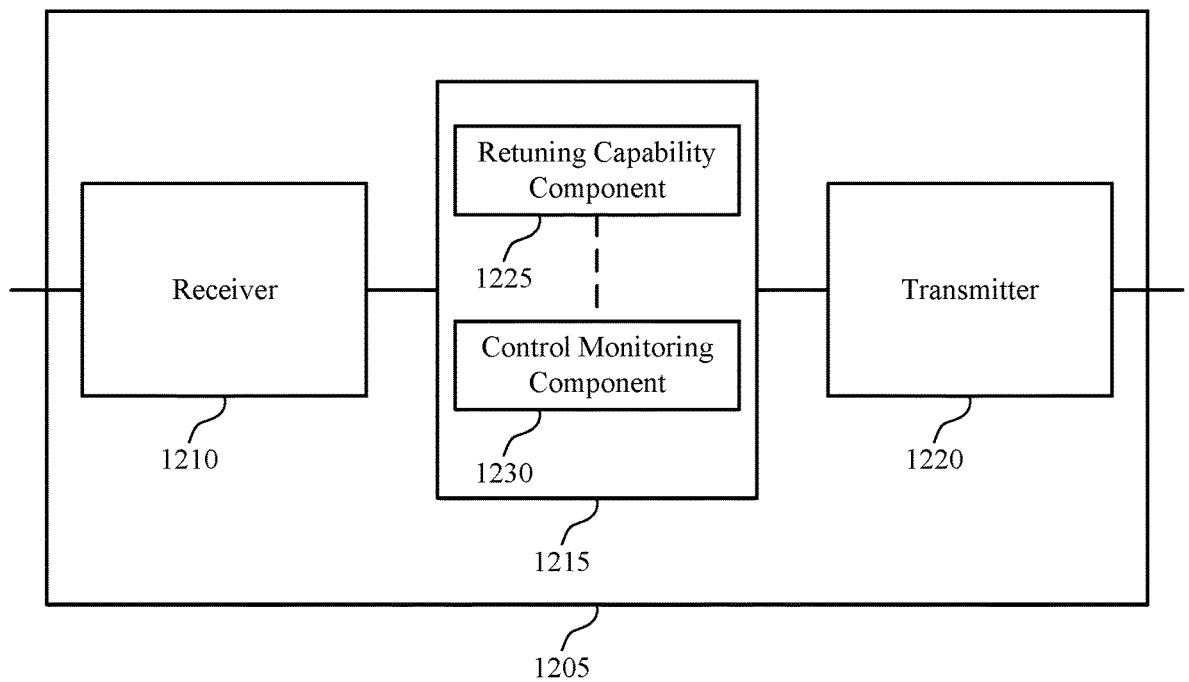

FIG. 12 shows a block diagram 1200 of a Wireless device 1205 that supports multiple antennas and interruption time values in SRS switching in accordance with various aspects of the present disclosure. Wireless device 1205 may be an example of aspects of a wireless device 1105 or a base station 105 as described with reference to FIGS. 1 and 11. Wireless device 1205 may include receiver 1210, base station SRS switching manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to multiple antennas and interruption time values in SRS switching, etc.). Information may be passed on to other components of the device. The receiver 1210 may be an example of aspects of the transceiver 1435 described with reference to FIG. 14.

Base station SRS switching manager 1215 may be an example of aspects of the base station SRS switching manager 1415 described with reference to FIG. 14. Base station SRS switching manager 1215 may also include retuning capability component 1225 and control monitoring component 1230.

Retuning capability component 1225 may receive an indication that a retuning time for a UE impacts a downlink reception capability. Control monitoring component 1230 may transmit an indication of a control channel monitoring mode based on the retuning time for the UE and the downlink reception capability. In some cases, the control channel monitoring mode excludes monitoring an enhanced physical downlink control channel (EPDCCH) during a subframe before an SRS transmission. In some cases, the control channel monitoring mode excludes monitoring a PDCCH during a subframe following a SRS transmission.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
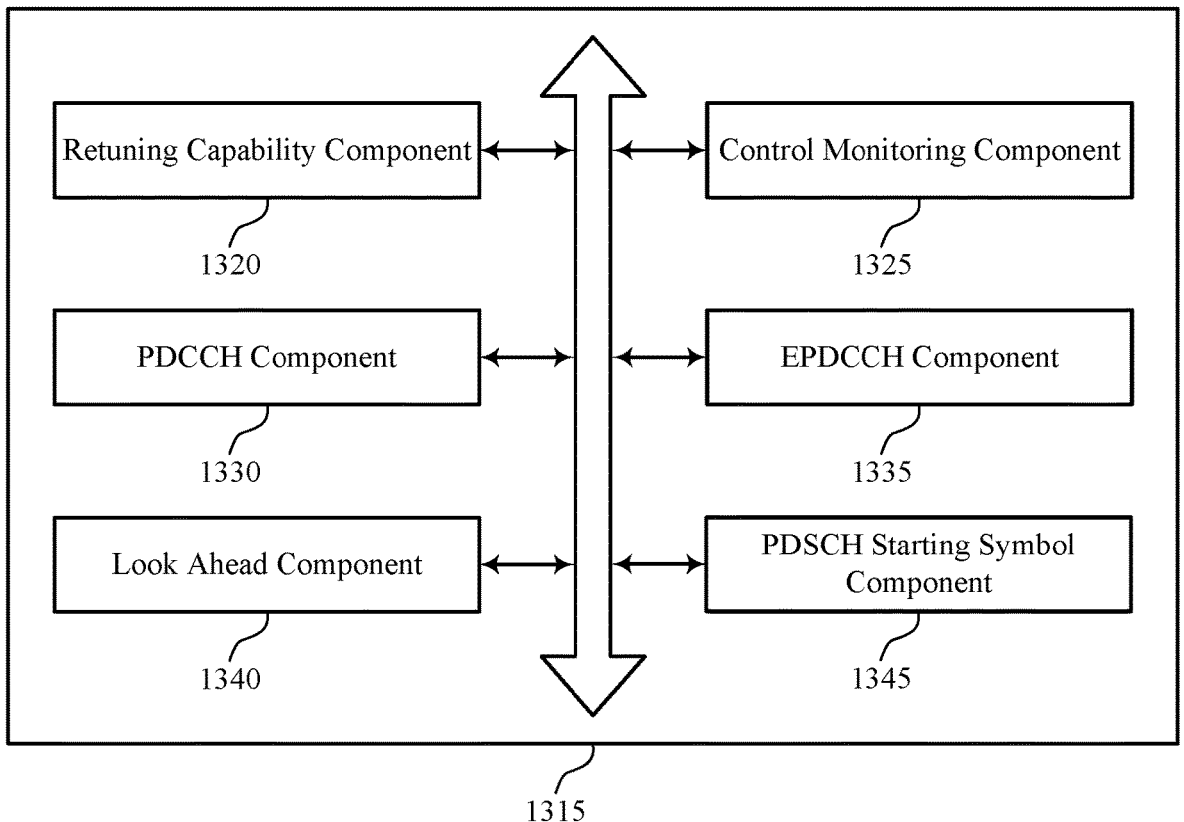

FIG. 13 shows a block diagram 1300 of a base station SRS switching manager 1315 that supports multiple antennas and interruption time values in SRS switching in accordance with various aspects of the present disclosure. The base station SRS switching manager 1315 may be an example of aspects of a base station SRS switching manager 1415 described with reference to FIGS. 11, 12, and 14. The base station SRS switching manager 1315 may include retuning capability component 1320, control monitoring component 1325, PDCCH component 1330, EPDCCH component 1335, look ahead component 1340, and PDSCH starting symbol component 1345. Each of these modules may communicate, directly or indirectly, with one another (e.g., via one or more buses).

Retuning capability component 1320 may, in combination with receiver 1210, receive an indication that a retuning time for a UE impacts a downlink reception capability. Control monitoring component 1325 may transmit an indication of a control channel monitoring mode based on the retuning time for the UE and the downlink reception capability. In some cases, the control channel monitoring mode excludes monitoring an enhanced physical downlink control channel (EPDCCH) during a subframe before an SRS transmission. In some cases, the control channel monitoring mode excludes monitoring a PDCCH during a subframe following a SRS transmission.

PDCCH component 1330 may, in combination with transmitter 1220, transmit a PDCCH during the subframe in before the SRS transmission. EPDCCH component 1335 may transmit an enhanced physical downlink control channel (EPDCCH) after the subframe following the SRS transmission. Look ahead component 1340 may receive an indication of a look ahead capacity from the UE. PDSCH starting symbol component 1345 may identify and signal a starting symbol for PDSCH or EPDCCH region to a UE 115 (e.g., using higher layer signaling). In some examples, the starting symbol may be based on a bandwidth of the first carrier.

Figure 14:
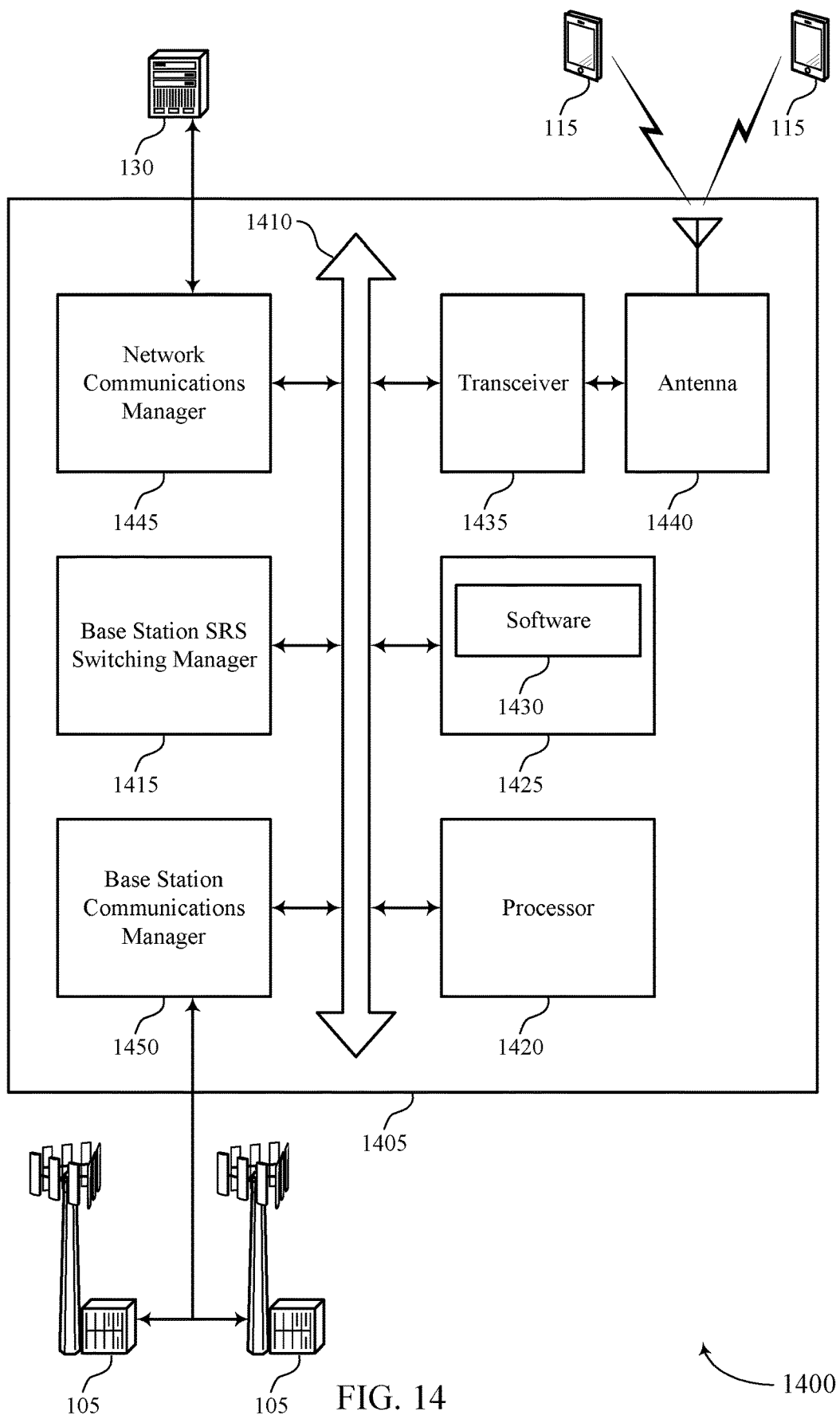
FIG. 14 illustrates a block diagram of a system including a base station that supports multiple antennas and interruption time values in SRS switching in accordance with aspects of the present disclosure.

FIG. 14 shows a diagram of a system 1400 including a device 1405 that supports multiple antennas and interruption time values in SRS switching in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including base station SRS switching manager 1415, processor 1420, memory 1425, software 1430, transceiver 1435, antenna 1440, network communications manager 1445, and base station communications manager 1450.

Processor 1420 may include an intelligent hardware device, (e.g., a general-purpose processor, a digital signal processor (DSP), a central processing unit (CPU), a microcontroller, an ASIC, a FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting multiple antennas and interruption time values in SRS switching) 1420.

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a Basic Input-Output system (BIOS) which may control basic hardware and/or software operation such as the interaction with peripheral components or devices.

Software 1430 may include code to implement aspects of the present disclosure, including code to support multiple antennas and interruption time values in SRS switching. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
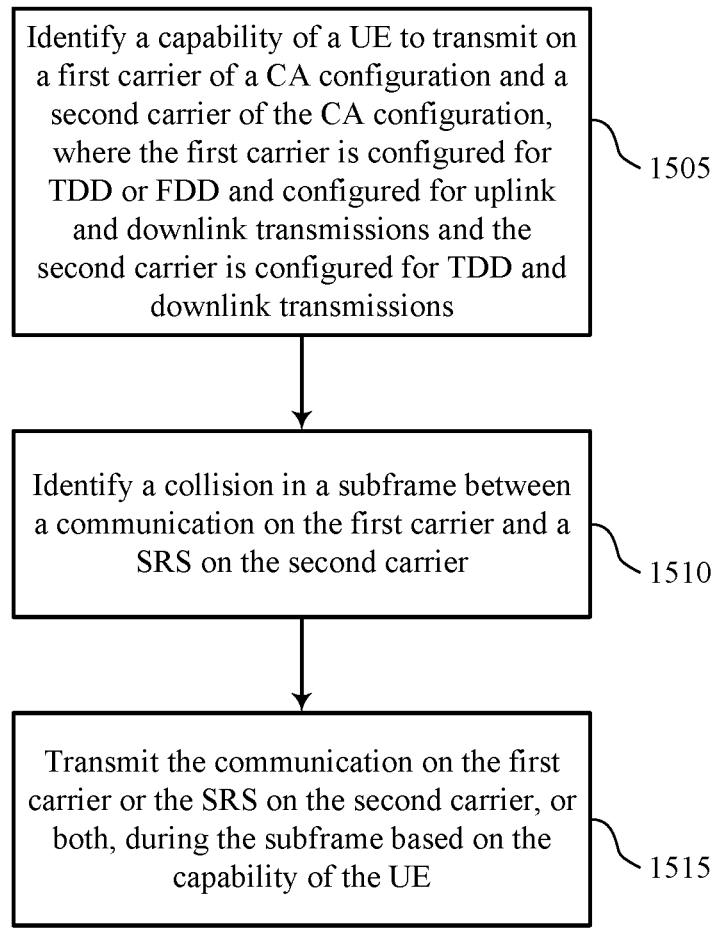
FIGS. 15 through 22 illustrate methods for multiple antennas and interruption time values in SRS switching in accordance with aspects of the present disclosure.

FIG. 15 shows a flowchart illustrating a method 1500 for multiple antennas and interruption time values in SRS switching in accordance with various aspects of the present disclosure. The operations of method 1500 may be implemented by a UE 115 or its components as described herein. For example, the operations of method 1500 may be performed by a UE SRS switching manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may identify a capability of a UE to transmit on a first carrier of a CA configuration and a second carrier of the CA configuration. The first carrier may be configured for TDD and FDD and configured for uplink and downlink transmissions and the second carrier may be configured for TDD and downlink transmissions. The operations of block 1505 may be performed according to the methods described with reference to FIGS. 1 through 6. In certain examples, aspects of the operations of block 1505 may be performed by a retuning capability component as described with reference to FIGS. 7 through 10.

At block 1510 the UE 115 may identify a collision in a subframe between a communication on the first carrier and a SRS on the second carrier. The operations of block 1510 may be performed according to the methods described with reference to FIGS. 1 through 6. In certain examples, aspects of the operations of block 1510 may be performed by a collision component as described with reference to FIGS. 7 through 10.

At block 1515 the UE 115 may transmit the communication on the first carrier or the SRS on the second carrier, or both, during the subframe based on the capability of the UE. The operations of block 1515 may be performed according to the methods described with reference to FIGS. 1 through 6. In certain examples, aspects of the operations of block 1515 may be performed by a transmitter as described with reference to FIGS. 7 through 10.

Figure 16:
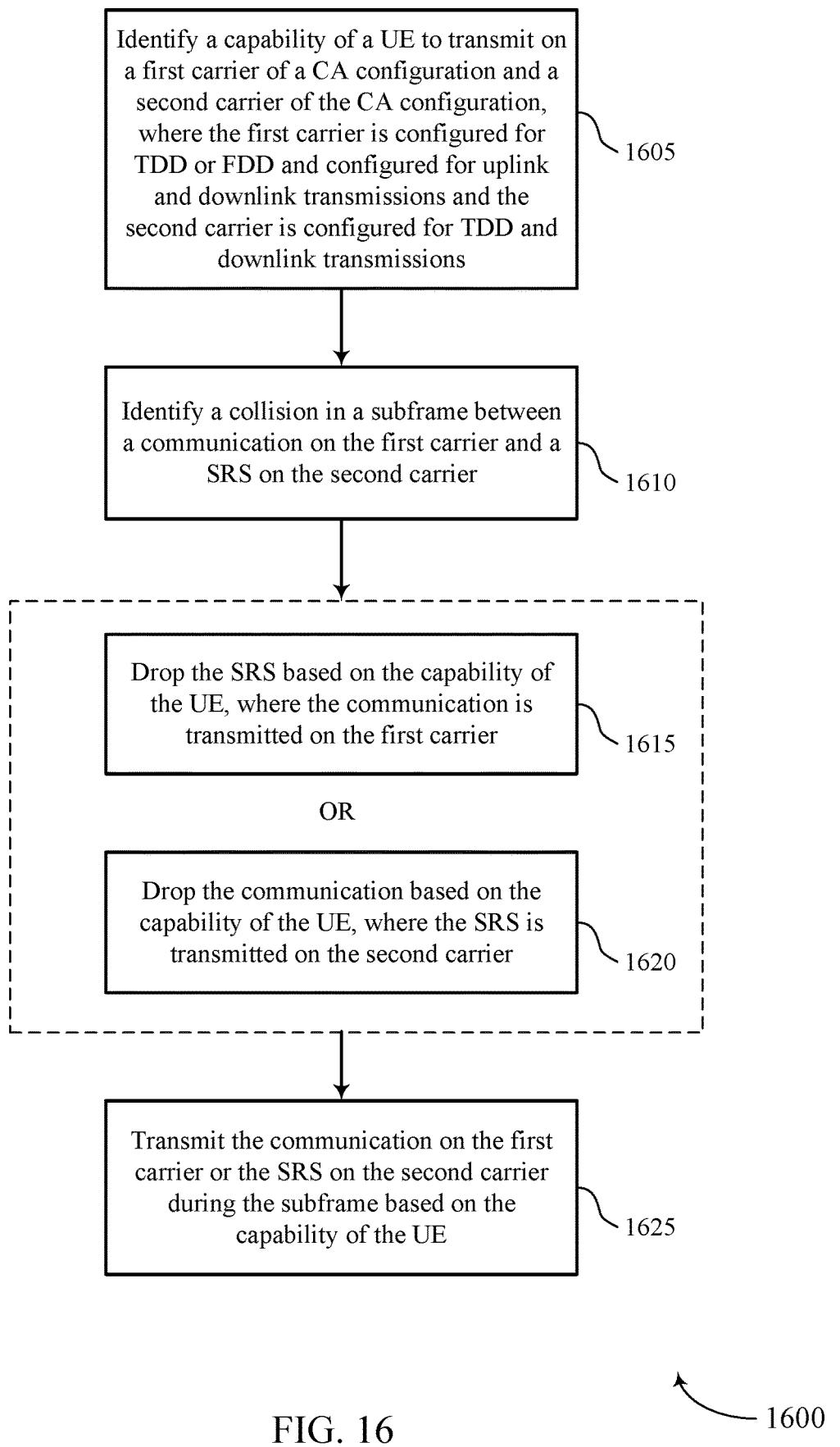

FIG. 16 shows a flowchart illustrating a method 1600 for multiple antennas and interruption time values in SRS switching in accordance with various aspects of the present disclosure. The operations of method 1600 may be implemented by a UE 115 or its components as described herein. For example, the operations of method 1600 may be performed by a UE SRS switching manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may identify a capability of a UE to transmit on a first carrier of a CA configuration and a second carrier of the CA configuration, where, for example, the first carrier is configured for TDD and FDD and configured for uplink and downlink transmissions and the second carrier is configured for TDD and downlink transmissions. The operations of block 1605 may be performed according to the methods described with reference to FIGS. 1 through 6. In certain examples, aspects of the operations of block 1605 may be performed by a retuning capability component as described with reference to FIGS. 7 through 10.

At block 1610 the UE 115 may identify a collision in a subframe between a communication on the first carrier and a SRS on the second carrier. The operations of block 1610 may be performed according to the methods described with reference to FIGS. 1 through 6. In certain examples, aspects of the operations of block 1610 may be performed by a collision component as described with reference to FIGS. 7 through 10.

At block 1615 the UE 115 may drop the SRS based on the capability of the UE, where, for example, the communication is transmitted on the first carrier. The operations of block 1615 may be performed according to the methods described with reference to FIGS. 1 through 6. In certain examples, aspects of the operations of block 1615 may be performed by a SRS dropping component as described with reference to FIGS. 7 through 10.

At block 1620 the UE 115 may drop the communication on the first carrier based on the capability of the UE, where, for example, the SRS is transmitted on the second carrier. The operations of block 1620 may be performed according to the methods described with reference to FIGS. 1 through 6. In certain examples, aspects of the operations of block 1620 may be performed by a uplink transmission dropping component as described with reference to FIGS. 7 through 10.

At block 1625 the UE 115 may transmit the communication on the first carrier or the SRS on the second carrier, or both, during the subframe based on the capability of the UE. The operations of block 1625 may be performed according to the methods described with reference to FIGS. 1 through 6. In certain examples, aspects of the operations of block 1625 may be performed by a transmitter as described with reference to FIGS. 7 through 10.

Figure 17:
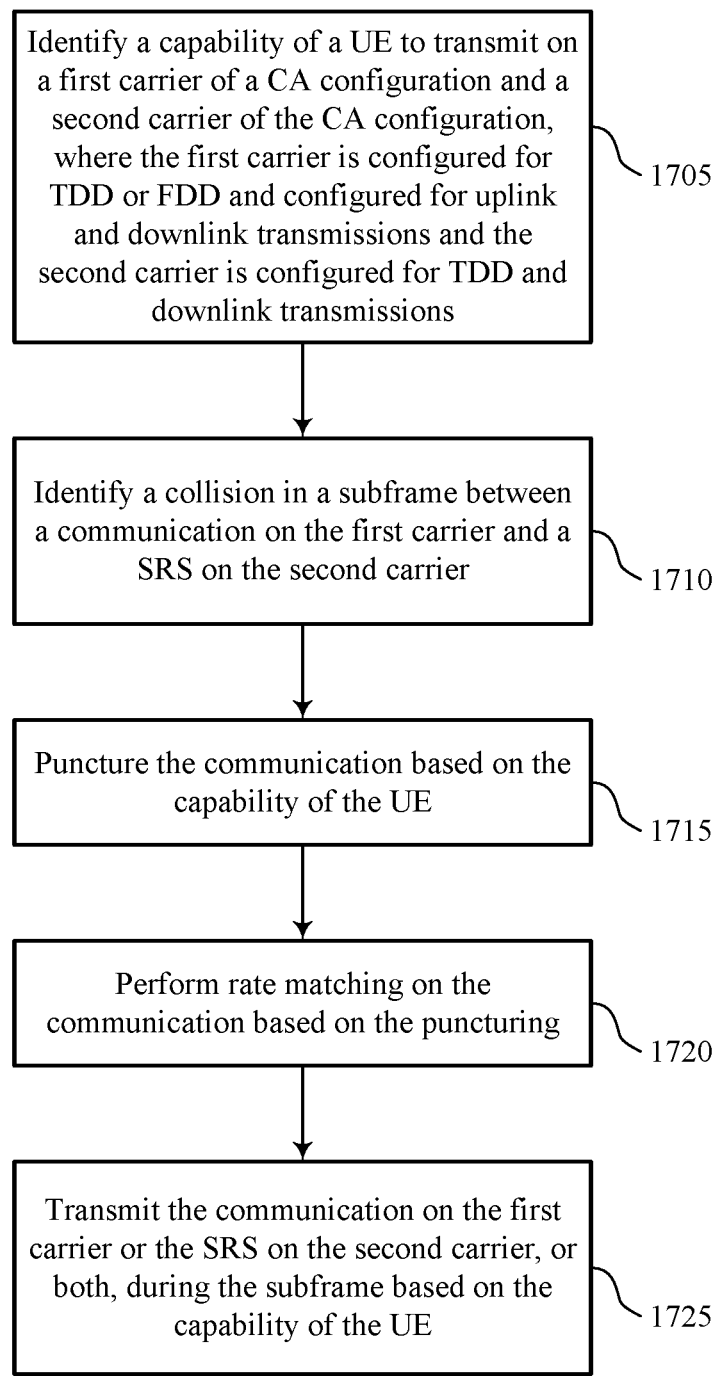

FIG. 17 shows a flowchart illustrating a method 1700 for multiple antennas and interruption time values in SRS switching in accordance with various aspects of the present disclosure. The operations of method 1700 may be implemented by a UE 115 or its components as described herein. For example, the operations of method 1700 may be performed by a UE SRS switching manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may identify a capability of a UE to transmit on a first carrier of a CA configuration and a second carrier of the CA configuration. The first carrier may be configured for TDD and FDD and configured for uplink and downlink transmissions and the second carrier may be configured for TDD and downlink transmissions. The operations of block 1705 may be performed according to the methods described with reference to FIGS. 1 through 6. In certain examples, aspects of the operations of block 1705 may be performed by a retuning capability component as described with reference to FIGS. 7 through 10.

At block 1710 the UE 115 may identify a collision in a subframe between a communication on the first carrier and a SRS on the second carrier. The operations of block 1710 may be performed according to the methods described with reference to FIGS. 1 through 6. In certain examples, aspects of the operations of block 1710 may be performed by a collision component as described with reference to FIGS. 7 through 10.

At block 1715 the UE 115 may puncture the communication on the first carrier based on the capability of the UE. The operations of block 1715 may be performed according to the methods described with reference to FIGS. 1 through 6. In certain examples, aspects of the operations of block 1715 may be performed by a puncturing component as described with reference to FIGS. 7 through 10.

At block 1720 the UE 115 may perform rate matching on the communication on the first carrier based on the puncturing. The operations of block 1720 may be performed according to the methods described with reference to FIGS. 1 through 6. In certain examples, aspects of the operations of block 1720 may be performed by a rate matching component as described with reference to FIGS. 7 through 10.

At block 1725 the UE 115 may transmit the communication on the first carrier or the SRS on the second carrier, or both, during the subframe based on the capability of the UE. The operations of block 1725 may be performed according to the methods described with reference to FIGS. 1 through 6. In certain examples, aspects of the operations of block 1725 may be performed by a transmitter as described with reference to FIGS. 7 through 10.

Figure 18:
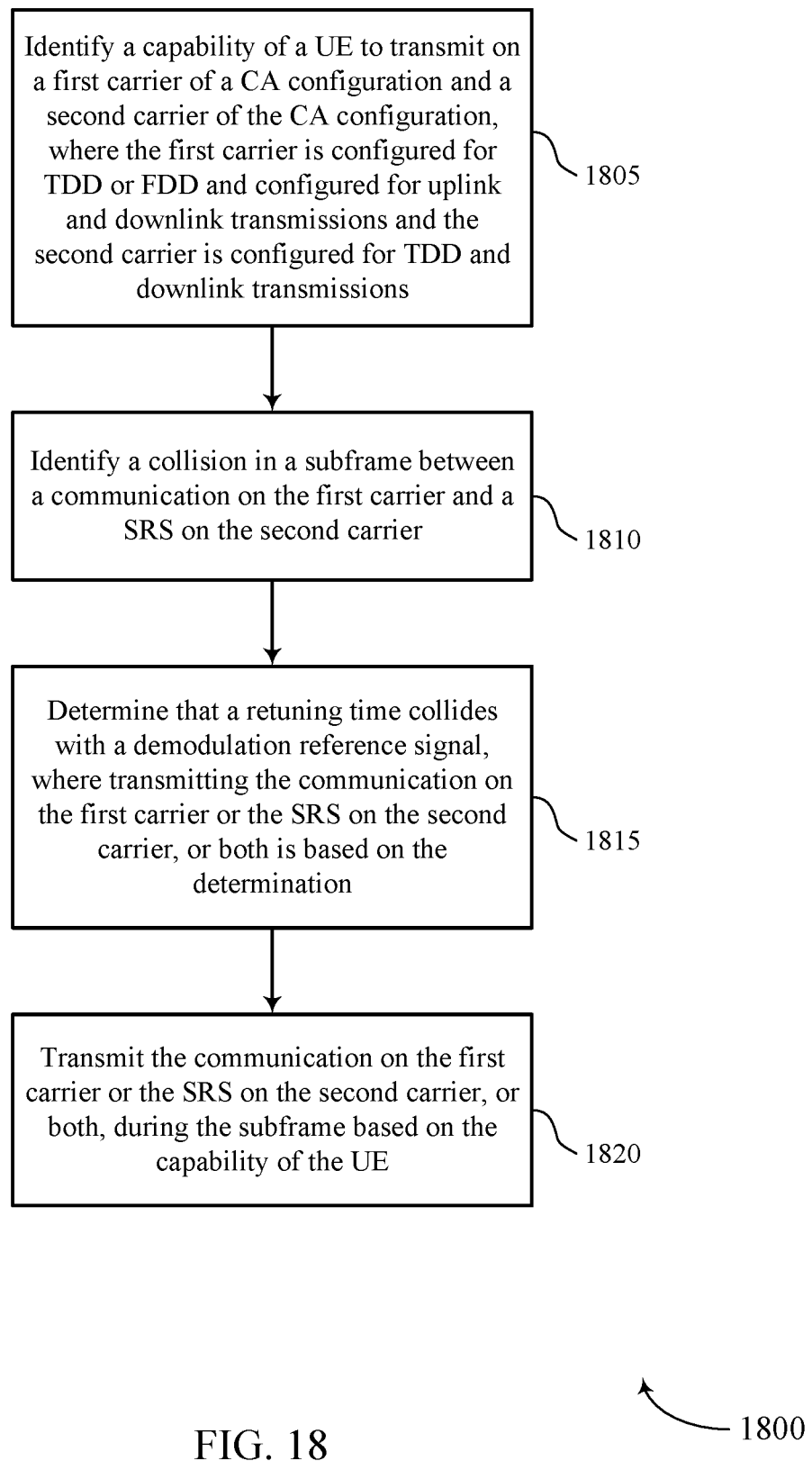

FIG. 18 shows a flowchart illustrating a method 1800 for multiple antennas and interruption time values in SRS switching in accordance with various aspects of the present disclosure. The operations of method 1800 may be implemented by a UE 115 or its components as described herein. For example, the operations of method 1800 may be performed by a UE SRS switching manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may identify a capability of a UE to transmit on a first carrier of a CA configuration and a second carrier of the CA configuration, where, for example, the first carrier is configured for TDD and FDD and configured for uplink and downlink transmissions and the second carrier is configured for TDD and downlink transmissions. The operations of block 1805 may be performed according to the methods described with reference to FIGS. 1 through 6. In certain examples, aspects of the operations of block 1805 may be performed by a retuning capability component as described with reference to FIGS. 7 through 10.

At block 1810 the UE 115 may identify a collision in a subframe between a communication on the first carrier and a SRS on the second carrier. The operations of block 1810 may be performed according to the methods described with reference to FIGS. 1 through 6. In certain examples, aspects of the operations of block 1810 may be performed by a collision component as described with reference to FIGS. 7 through 10.

At block 1815 the UE 115 may determine that a retuning time collides with a demodulation reference signal, where transmitting the communication on the first carrier or the SRS on the second carrier, or both, may be based on the determination. The operations of block 1815 may be performed according to the methods described with reference to FIGS. 1 through 6. In certain examples, aspects of the operations of block 1815 may be performed by a DMRS collision component as described with reference to FIGS. 7 through 10.

At block 1820 the UE 115 may transmit the communication on the first carrier or the SRS on the second carrier, or both, during the subframe based on the capability of the UE. The operations of block 1820 may be performed according to the methods described with reference to FIGS. 1 through 6. In certain examples, aspects of the operations of block 1820 may be performed by a transmitter as described with reference to FIGS. 7 through 10.

Figure 19:
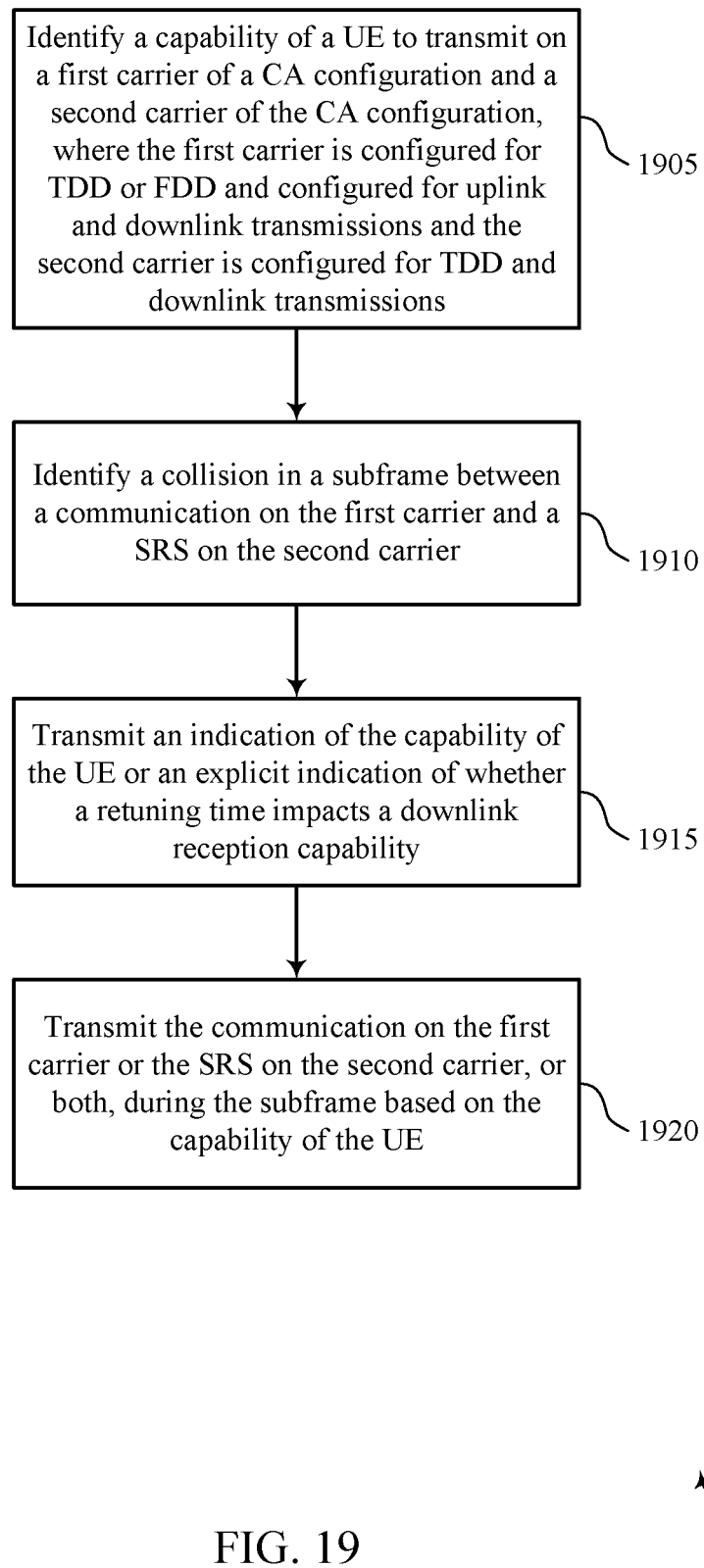

FIG. 19 shows a flowchart illustrating a method 1900 for multiple antennas and interruption time values in SRS switching in accordance with various aspects of the present disclosure. The operations of method 1900 may be implemented by a UE 115 or its components as described herein. For example, the operations of method 1900 may be performed by a UE SRS switching manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may identify a capability of a UE to transmit on a first carrier of a CA configuration and a second carrier of the CA configuration, where, for example, the first carrier is configured for TDD and FDD and configured for uplink and downlink transmissions and the second carrier is configured for TDD and downlink transmissions. The operations of block 1905 may be performed according to the methods described with reference to FIGS. 1 through 6. In certain examples, aspects of the operations of block 1905 may be performed by a retuning capability component as described with reference to FIGS. 7 through 10.

At block 1910 the UE 115 may identify a collision in a subframe between a communication on the first carrier and a SRS on the second carrier. The operations of block 1910 may be performed according to the methods described with reference to FIGS. 1 through 6. In certain examples, aspects of the operations of block 1910 may be performed by a collision component as described with reference to FIGS. 7 through 10.

At block 1915 the UE 115 may transmit an indication of the capability of the UE or an explicit indication of whether a retuning time impacts a downlink reception capability. The operations of block 1915 may be performed according to the methods described with reference to FIGS. 1 through 6. In certain examples, aspects of the operations of block 1915 may be performed by a downlink retuning component as described with reference to FIGS. 7 through 10.

At block 1920 the UE 115 may transmit the communication on the first carrier or the SRS on the second carrier, or both, during the subframe based on the capability of the UE. The operations of block 1920 may be performed according to the methods described with reference to FIGS. 1 through 6. In certain examples, aspects of the operations of block 1920 may be performed by a transmitter as described with reference to FIGS. 7 through 10.

Figure 20:
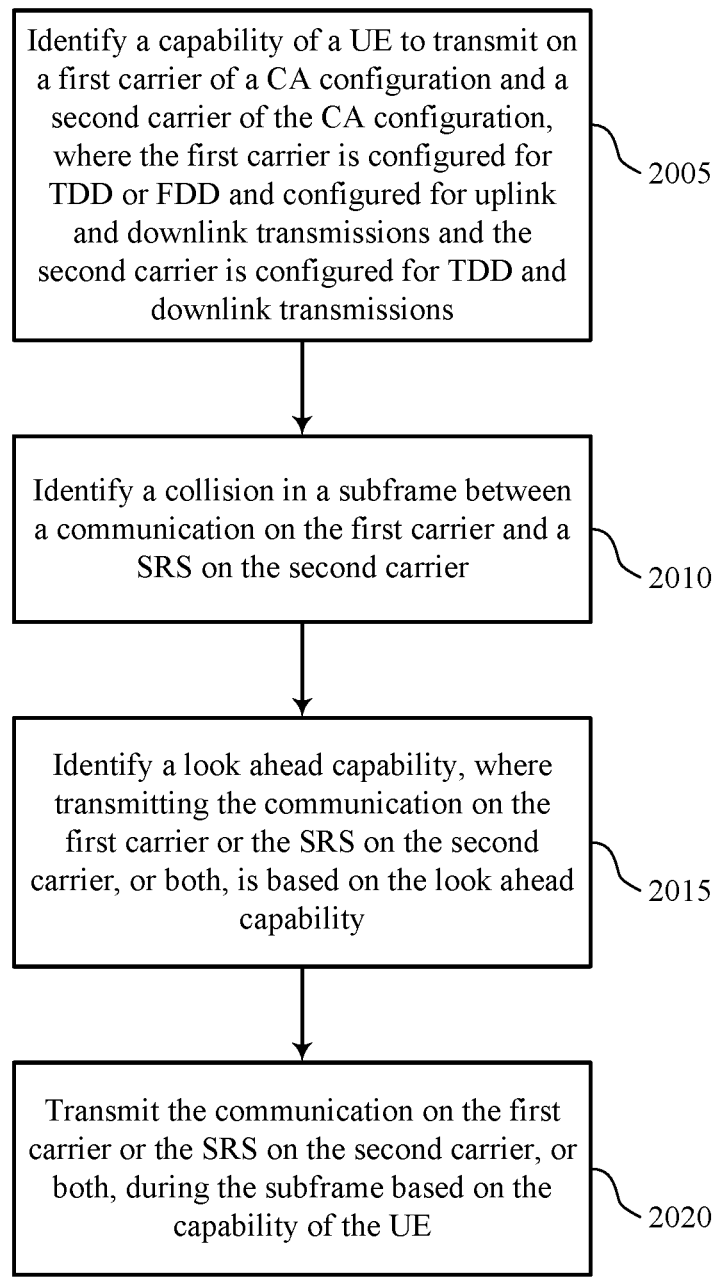

FIG. 20 shows a flowchart illustrating a method 2000 for multiple antennas and interruption time values in SRS switching in accordance with various aspects of the present disclosure. The operations of method 2000 may be implemented by a UE 115 or its components as described herein. For example, the operations of method 2000 may be performed by a UE SRS switching manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may identify a capability of a UE to transmit on a first carrier of a CA configuration and a second carrier of the CA configuration, where, for example, the first carrier is configured for TDD and FDD and configured for uplink and downlink transmissions and the second carrier is configured for TDD and downlink transmissions. The operations of block 2005 may be performed according to the methods described with reference to FIGS. 1 through 6. In certain examples, aspects of the operations of block 2005 may be performed by a retuning capability component as described with reference to FIGS. 7 through 10.

At block 2010 the UE 115 may identify a collision in a subframe between a communication on the first carrier and a SRS on the second carrier. The operations of block 2010 may be performed according to the methods described with reference to FIGS. 1 through 6. In certain examples, aspects of the operations of block 2010 may be performed by a collision component as described with reference to FIGS. 7 through 10.

At block 2015 the UE 115 may identify a look ahead capability, where transmitting the communication on the first carrier or the SRS on the second carrier, or both, may be based on the look ahead capability. The operations of block 2015 may be performed according to the methods described with reference to FIGS. 1 through 6. In certain examples, aspects of the operations of block 2015 may be performed by a look ahead component as described with reference to FIGS. 7 through 10.

At block 2020 the UE 115 may transmit the communication on the first carrier or the SRS on the second carrier, or both, during the subframe based on the capability of the UE. The operations of block 2020 may be performed according to the methods described with reference to FIGS. 1 through 6. In certain examples, aspects of the operations of block 2020 may be performed by a transmitter as described with reference to FIGS. 7 through 10.

Figure 21:
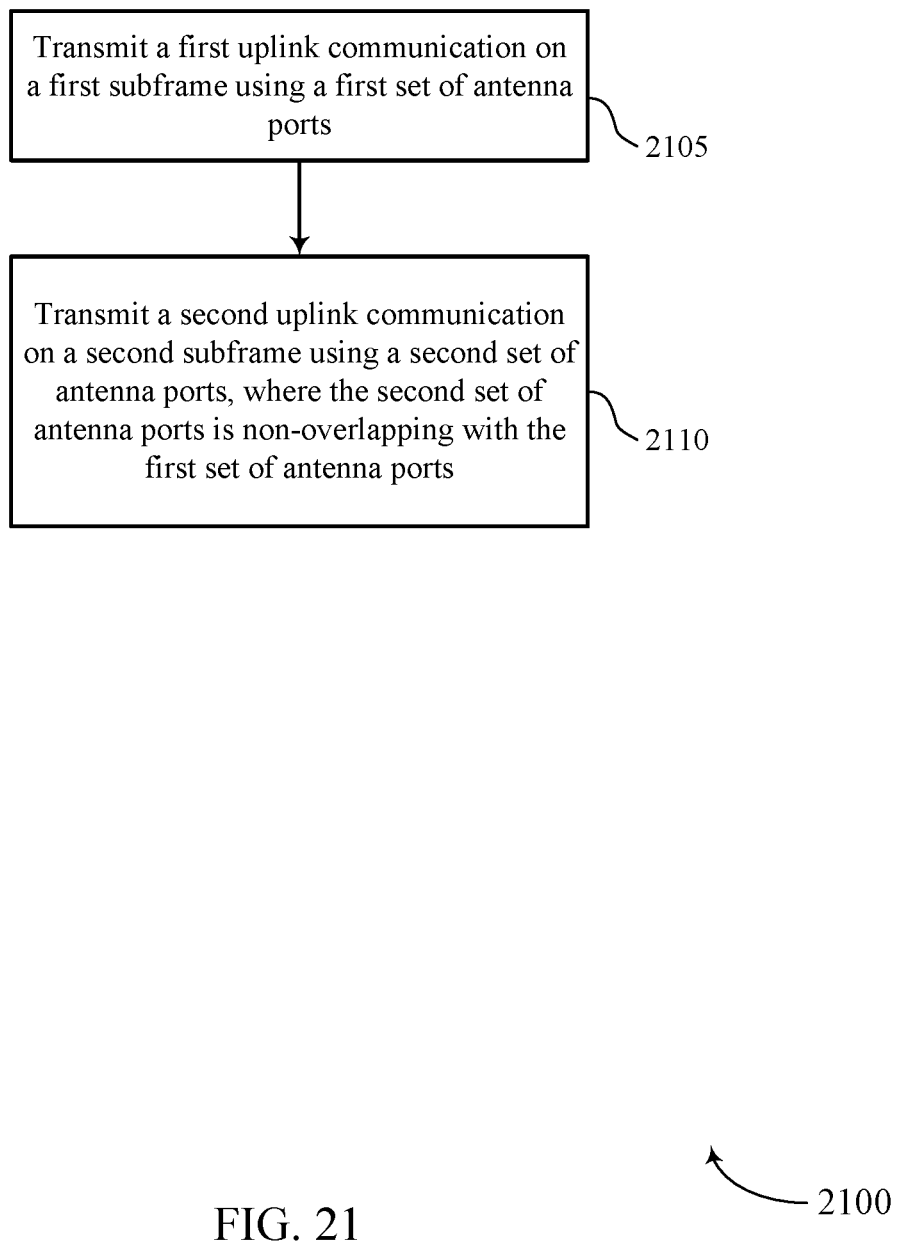

FIG. 21 shows a flowchart illustrating a method 2100 for multiple antennas and interruption time values in SRS switching in accordance with various aspects of the present disclosure. The operations of method 2100 may be implemented by a UE 115 or its components as described herein. For example, the operations of method 2100 may be performed by a UE SRS switching manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 2105 the UE 115 may transmit a first uplink communication on a first subframe using a first set of antenna ports. The operations of block 2105 may be performed according to the methods described with reference to FIGS. 1 through 6. In certain examples, aspects of the operations of block 2105 may be performed by an antenna switching component as described with reference to FIGS. 7 through 10.

At block 2110 the UE 115 may transmit a second uplink communication on a second subframe using a second set of antenna ports, where the second set of antenna ports may be non-overlapping with the first set of antenna ports. The operations of block 2110 may be performed according to the methods described with reference to FIGS. 1 through 6. In certain examples, aspects of the operations of block 2110 may be performed by an antenna switching component as described with reference to FIGS. 7 through 10.

Figure 22:
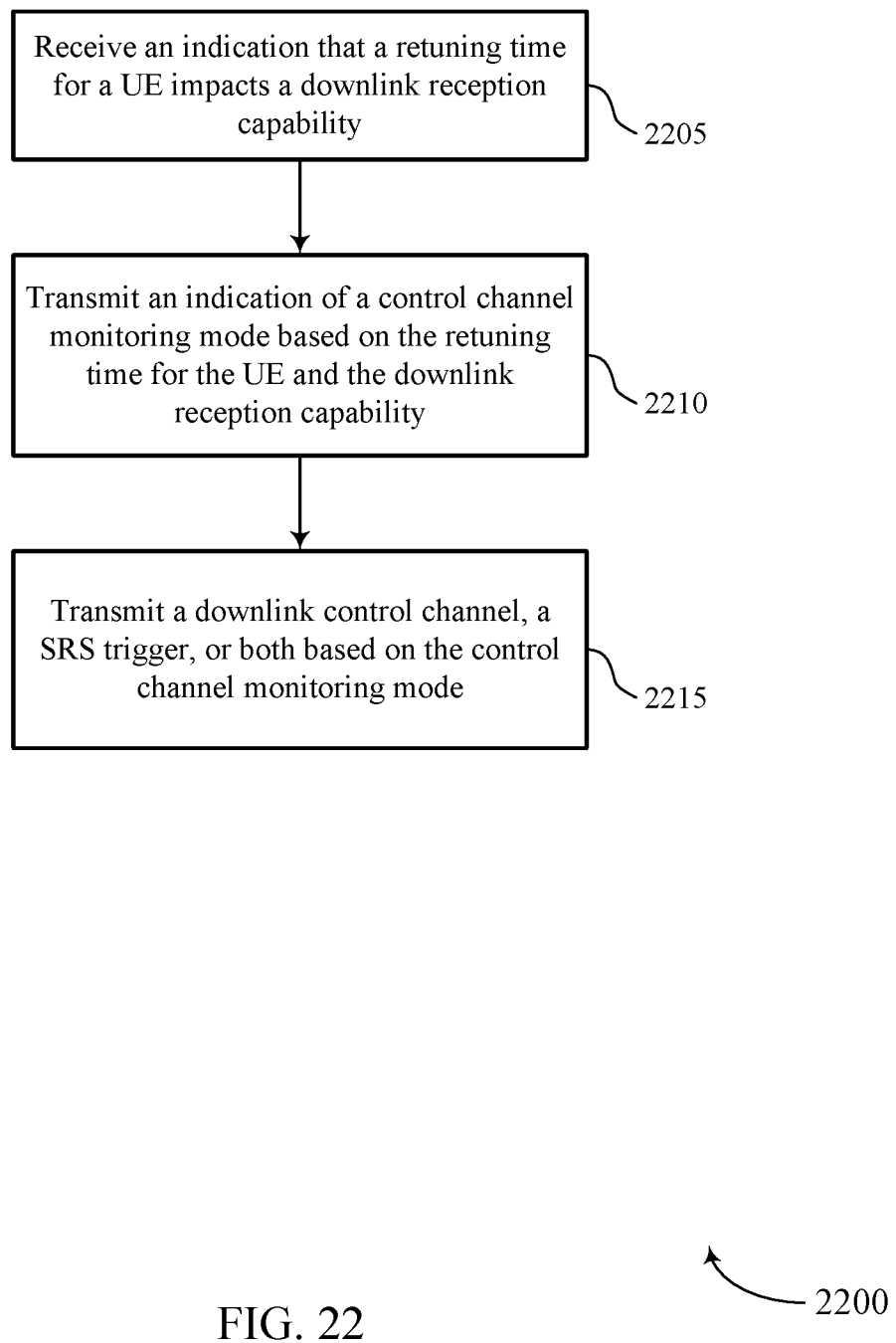

FIG. 22 shows a flowchart illustrating a method 2200 for multiple antennas and interruption time values in SRS switching in accordance with various aspects of the present disclosure. The operations of method 2200 may be implemented by a base station 105 or its components as described herein. For example, the operations of method 2200 may be performed by a base station SRS switching manager as described with reference to FIGS. 11 through 14. In some examples, a base station 105 may execute a set of codes to control the functional elements of the device to perform the functions described below. Additionally or alternatively, the base station 105 may perform aspects the functions described below using special-purpose hardware.

At block 2205 the base station 105 may receive an indication that a retuning time for a UE impacts a downlink reception capability. The operations of block 2205 may be performed according to the methods described with reference to FIGS. 1 through 6. In certain examples, aspects of the operations of block 2205 may be performed by a retuning capability component as described with reference to FIGS. 11 through 14.

At block 2210 the base station 105 may transmit an indication of a control channel monitoring mode based on the retuning time for the UE and the downlink reception capability. The operations of block 2210 may be performed according to the methods described with reference to FIGS. 1 through 6. In certain examples, aspects of the operations of block 2210 may be performed by a control monitoring component as described with reference to FIGS. 11 through 14.

At block 2215 the base station 105 may transmit a downlink control channel, a SRS trigger, or both based on the control channel monitoring mode. The operations of block 2215 may be performed according to the methods described with reference to FIGS. 1 through 6. In certain examples, aspects of the operations of block 2215 may be performed by a transmitter as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell may be a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a capability of a user equipment (UE) to transmit on a first carrier of a carrier aggregation (CA) configuration and a second carrier of the CA configuration, wherein the first carrier is configured for time division duplexing (TDD) or frequency division duplexing (FDD) and configured for uplink and downlink transmissions and the second carrier is configured for TDD and downlink transmissions;
   identifying a collision in a subframe between a communication on the first carrier and a sounding reference signal (SRS) on the second carrier, wherein the collision is identified based at least in part on the communication on the first carrier colliding with a retuning time for transmitting the SRS;
   transmitting an explicit indication of whether the retuning time impacts the capability of the UE; and
   transmitting the communication on the first carrier or the SRS on the second carrier, or both, during the subframe based at least in part on the capability of the UE.

2. The method of claim 1, further comprising:
   dropping the SRS based at least in part on the capability of the UE, and transmitting the communication on the first carrier.

3. The method of claim 1, further comprising:
   dropping the communication on the first carrier based at least in part on the capability of the UE, and transmitting the SRS on the second carrier.

4. The method of claim 1, further comprising:
   puncturing the communication on the first carrier based at least in part on the capability of the UE.

5. The method of claim 4, further comprising:
   performing rate matching on the communication on the first carrier based at least in part on the puncturing.

6. The method of claim 1, wherein the capability of the UE comprises a retuning time.

7. The method of claim 1, wherein the capability of the UE comprises a retuning time corresponding to a number of symbol periods, and wherein the communication on the first carrier is dropped when the number of symbol periods exceeds a predetermined threshold.

8. The method of claim 1, wherein the communication on the first carrier comprises a physical uplink shared channel (PUSCH) communication, the method further comprising:
   dropping the SRS when the collision involves symbols of a demodulation reference signal (DMRS), or puncturing the PUSCH transmission when the collision does not involve symbols of the DMRS.

9. The method of claim 1, wherein the communication on the first carrier comprises a physical uplink shared channel (PUSCH) communication, the method further comprising:
   dropping the SRS when the PUSCH communication comprises hybrid automatic repeat request (HARQ) feedback and the collision involves symbols of the HARQ feedback.

10. The method of claim 1, wherein the communication on the first carrier or the SRS on the second carrier, or both are transmitted based at least in part on a content of the communication, a channel type, a cyclic prefix length, or any combination thereof.

11. The method of claim 1, wherein the communication on the first carrier or the SRS on the second carrier, or both, are transmitted based at least in part on a radio resource control (RRC) configuration or an enhanced interference mitigation and traffic adaptation (eIMTA) configuration.

12. The method of claim 1, wherein the communication and the SRS are in a same subframe.

13. The method of claim 1, further comprising:
    identifying a retuning time threshold, wherein transmitting the communication on the first carrier or the SRS on the second carrier, or both, is based at least in part on the retuning time threshold.

14. The method of claim 1, further comprising:
    determining that a retuning time collides with a demodulation reference signal, wherein transmitting the communication on the first carrier or the SRS on the second carrier, or both is based at least in part on the determination.

15. The method of claim 1, further comprising:
    transmitting an indication of the capability of the UE.

16. The method of claim 15, further comprising:
    selecting a control channel monitoring mode based at least in part on the capability of the UE; and
    refraining from monitoring a control channel based at least in part on the control channel monitoring mode.

17. The method of claim 1, further comprising:
    identifying a prioritization scheme that includes hybrid automatic repeat request (HARQ) feedback, aperiodic channel state information (A-CSI), channel quality information (CQI), demodulation reference signals (DMRS), aperiodic SRS (A-SRS), periodic channel state information (P-CSI), periodic SRS (P-SRS), user data, or any combination thereof, wherein transmitting the communication on the first carrier or the SRS on the second carrier, or both is based at least in part on the prioritization scheme.

18. The method of claim 1, further comprising:
    determining that the first carrier has not been monitored during a symbol period designated for a physical hybrid automatic repeat request (HARQ) indicator channel (PHICH) based at least in part on transmitting the SRS on the second carrier; and
    suspending an uplink HARQ process based at least in part on the determination.

19. The method of claim 1, further comprising:
    determining that the first carrier has not been monitored during a symbol period designated for a physical control format indicator channel (PCFICH) based at least in part on transmitting the SRS on the second carrier; and identifying a starting symbol period of a physical downlink shared channel (PDSCH) or an enhanced physical downlink control channel (EPDCCH) based at least in part on the determination.

20. The method of claim 19, wherein identifying the starting symbol period is based at least in part on a bandwidth of the first carrier.

21. The method of claim 19, further comprising:
receiving an indication of the starting symbol period prior to transmitting the SRS on the second carrier, wherein identifying the starting symbol period is based at least in part on receiving the indication.

22. The method of claim 19, further comprising:
scaling a transport block size (TBS) based at least in part on the identified starting symbol.

23. An apparatus for wireless communication, comprising:
means for identifying a capability of a user equipment (UE) to transmit on a first carrier of a carrier aggregation (CA) configuration and a second carrier of the CA configuration, wherein the first carrier is configured for time division duplexing (TDD) or frequency division duplexing (FDD) and configured for uplink and downlink transmissions and the second carrier is configured for TDD and downlink transmissions;
means for identifying a collision in a subframe between a communication on the first carrier and a sounding reference signal (SRS) on the second carrier, wherein the collision is identified based at least in part on the communication on the first carrier colliding with a retuning time for transmitting the SRS;
means for transmitting an explicit indication of whether the retuning time impacts the capability of the UE; and
means for transmitting the communication on the first carrier or the SRS on the second carrier, or both, during the subframe based at least in part on the capability of the UE.

24. The apparatus of claim 23, further comprising:
means for dropping the SRS based at least in part on the capability of the UE, and transmitting the communication on the first carrier.

25. The apparatus of claim 23, further comprising:
means for dropping the communication on the first carrier based at least in part on the capability of the UE, and transmitting the SRS on the second carrier.

26. The apparatus of claim 23, further comprising:
means for puncturing the communication on the first carrier based at least in part on the capability of the UE.

27. The apparatus of claim 26, further comprising:
means for performing rate matching on the communication on the first carrier based at least in part on the puncturing.

28. The apparatus of claim 23, wherein the capability of the UE comprises a retuning time.

29. The apparatus of claim 23, wherein the means for transmitting the communication on the first carrier or the SRS on the second carrier, or both, are is operable to transmit based at least in part on a content of the communication, a channel type, a cyclic prefix length, or any combination thereof.

30. The apparatus of claim 23, wherein the means for transmitting the communication on the first carrier or the SRS on the second carrier, or both, is operable to transmit based at least in part on a radio resource control (RRC) configuration or an enhanced interference mitigation and traffic adaptation (eIMTA) configuration.

31. The apparatus of claim 23, wherein the communication and the SRS are in a same subframe.

32. The apparatus of claim 23, further comprising:
means for identifying a retuning time threshold, wherein the means for transmitting the communication on the first carrier or the SRS on the second carrier, or both, is operable based at least in part on the retuning time threshold.

33. The apparatus of claim 23, further comprising:
means for determining that a retuning time collides with a demodulation reference signal, wherein the means for transmitting the communication on the first carrier or the SRS on the second carrier, or both, is operable based at least in part on the determination.

34. The apparatus of claim 23, further comprising:
means for transmitting an indication of the capability of the UE.

35. The apparatus of claim 34, further comprising:
means for selecting a control channel monitoring mode based at least in part on the capability of the UE; and
means for refraining from monitoring a control channel based at least in part on the control channel monitoring mode.

36. The apparatus of claim 23, further comprising:
means for identifying a prioritization scheme that includes hybrid automatic repeat request (HARQ) feedback, aperiodic channel state information (A-CSI), channel quality information (CQI), demodulation reference signals (DMRS), aperiodic SRS (A-SRS), periodic channel state information (P-CSI), periodic SRS (P-SRS), user data, or any combination thereof, wherein the means for transmitting the communication on the first carrier or the SRS on the second carrier, or both, is operable based at least in part on the prioritization scheme.

37. The apparatus of claim 23, further comprising:
means for determining that the first carrier has not been monitored during a symbol period designated for a physical hybrid automatic repeat request (HARQ) indicator channel (PHICH) based at least in part on transmitting the SRS on the second carrier; and
means for suspending an uplink HARQ process based at least in part on the determination.

38. The apparatus of claim 23, further comprising:
means for determining that the first carrier has not been monitored during a symbol period designated for a physical control format indicator channel (PCFICH) based at least in part on transmitting the SRS on the second carrier; and
means for identifying a starting symbol period of a physical downlink shared channel (PDSCH) or an enhanced physical downlink control channel (EPDCCH) based at least in part on the determination.

39. The apparatus of claim 38, wherein identifying the starting symbol period is based at least in part on a bandwidth of the first carrier.

40. The apparatus of claim 38, further comprising:
means for receiving an indication of the starting symbol period prior to transmitting the SRS on the second carrier, wherein identifying the starting symbol period is based at least in part on receiving the indication.

41. The apparatus of claim 38, further comprising:
means for scaling a transport block size (TBS) based at least in part on the identified starting symbol.

42. A mobile device, comprising:
a processor;
memory in electronic communication with the processor; and
instructions stored in the memory and operable, when executed by the processor, to cause the mobile device to:
identify a capability of the mobile device to transmit on a first carrier of a carrier aggregation (CA) configuration and a second carrier of the CA configuration, wherein the first carrier is configured for time division duplexing (TDD) or frequency division duplexing (FDD) and configured for uplink and downlink transmissions and the second carrier is configured for TDD and downlink transmissions;
identify a collision in a subframe between a communication on the first carrier and a sounding reference signal (SRS) on the second carrier, wherein the collision is identified based at least in part on the communication on the first carrier colliding with a retuning time for transmitting the SRS;
transmit an explicit indication of whether the retuning time impacts the capability of the UE; and
transmit the communication on the first carrier or the SRS on the second carrier, or both, during the subframe based at least in part on the capability of the UE.

43. The mobile device of claim 42, wherein the instructions are further executable by the processor to cause the mobile device to:
drop the SRS based at least in part on the capability of the mobile device; and
transmit the communication on the first carrier.

44. The mobile device of claim 42, wherein the instructions are further executable by the processor to cause the mobile device to:
drop the communication on the first carrier based at least in part on the capability of the mobile device; and
transmit the SRS on the second carrier.

45. The mobile device of claim 42, wherein the instructions are further executable by the processor to cause the mobile device to:
puncture the communication on the first carrier based at least in part on the capability of the mobile device.

46. The mobile device of claim 45, wherein the instructions are further executable by the processor to cause the mobile device to:
perform rate matching on the communication on the first carrier based at least in part on the puncturing.

47. The mobile device of claim 42, wherein the capability of the mobile device comprises a retuning time.

48. The mobile device of claim 42, wherein the instructions are further executable by the processor to cause the mobile device to:
transmit the communication on the first carrier or the SRS on the second carrier, or both, based at least in part on a content of the communication, a channel type, a cyclic prefix length, or any combination thereof.

49. The mobile device of claim 42, wherein the instructions are further executable by the processor to cause the mobile device to:
transmit the communication on the first carrier or the SRS on the second carrier, or both, based at least in part on a radio resource control (RRC) configuration or an enhanced interference mitigation and traffic adaptation (eIMTA) configuration.

50. The mobile device of claim 42, wherein the communication and the SRS are in a same subframe.

51. The mobile device of claim 42, wherein the instructions are further executable by the processor to cause the mobile device to:
identify a retuning time threshold; and
transmit the communication on the first carrier or the SRS on the second carrier, or both, based at least in part on the retuning time threshold.

52. The mobile device of claim 42, wherein the instructions are further executable by the processor to cause the mobile device to:
determine that a retuning time collides with a demodulation reference signal; and
transmit the communication on the first carrier or the SRS on the second carrier, or both, based at least in part on the determination.

53. The mobile device of claim 42, wherein the instructions are further executable by the processor to cause the mobile device to:
transmit an indication of the capability of the UE.

54. The mobile device of claim 53, wherein the instructions are further executable by the processor to cause the mobile device to:
select a control channel monitoring mode based at least in part on the capability of the UE; and
refrain from monitoring a control channel based at least in part on the control channel monitoring mode.

55. The mobile device of claim 42, wherein the instructions are further executable by the processor to cause the mobile device to:
identify a prioritization scheme that includes hybrid automatic repeat request (HARQ) feedback, aperiodic channel state information (A-CSI), channel quality information (CQI), demodulation reference signals (DMRS), aperiodic SRS (A-SRS), periodic channel state information (P-CSI), periodic SRS (P-SRS), user data, or any combination thereof, wherein transmitting the communication on the first carrier or the SRS on the second carrier, or both is based at least in part on the prioritization scheme.

56. The mobile device of claim 42, wherein the instructions are further executable by the processor to cause the mobile device to:
determine that the first carrier has not been monitored during a symbol period designated for a physical hybrid automatic repeat request (HARQ) indicator channel (PHICH) based at least in part on transmitting the SRS on the second carrier; and
suspend an uplink HARQ process based at least in part on the determination.

57. The mobile device of claim 42, wherein the instructions are further executable by the processor to cause the mobile device to:
determine that the first carrier has not been monitored during a symbol period designated for a physical control format indicator channel (PCFICH) based at least in part on transmitting the SRS on the second carrier; and
identify a starting symbol period of a physical downlink shared channel (PDSCH) or an enhanced physical downlink control channel (EPDCCH) based at least in part on the determination.

58. The mobile device of claim 57, wherein identifying the starting symbol period is based at least in part on a bandwidth of the first carrier.

59. The mobile device of claim 57, wherein the instructions are further executable by the processor to cause the mobile device to:

receive an indication of the starting symbol period prior to transmitting the SRS on the second carrier, wherein identifying the starting symbol period is based at least in part on receiving the indication.

60. The mobile device of claim 57, wherein the instructions are further executable by the processor to cause the mobile device to:

scale a transport block size (TBS) based at least in part on the identified starting symbol.

61. A non-transitory computer readable medium storing code for wireless communication, the code comprising instructions executable to:

identify a capability of a user equipment (UE) to transmit on a first carrier of a carrier aggregation (CA) configuration and a second carrier of the CA configuration, wherein the first carrier is configured for time division duplexing (TDD) or frequency division duplexing (FDD) and configured for uplink and downlink transmissions and the second carrier is configured for TDD and downlink transmissions;

identify a collision in a subframe between a communication on the first carrier and a sounding reference signal (SRS) on the second carrier, wherein the collision is identified based at least in part on the communication on the first carrier colliding with a retuning time for transmitting the SRS;

transmit an explicit indication of whether the retuning time impacts the capability of the UE; and transmit the communication on the first carrier or the SRS on the second carrier, or both, during the subframe based at least in part on the capability of the UE.

* * * * *